United States Patent
Kano

(10) Patent No.: US 9,167,216 B2
(45) Date of Patent: Oct. 20, 2015

(54) IMAGE PROCESSING APPARATUS, IMAGE CAPTURE APPARATUS AND IMAGE PROCESSING METHOD

(75) Inventor: Akira Kano, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 13/591,467

(22) Filed: Aug. 22, 2012

(65) Prior Publication Data

US 2013/0050540 A1 Feb. 28, 2013

(30) Foreign Application Priority Data

Aug. 31, 2011 (JP) .................................. 2011-189325

(51) Int. Cl.
*G06K 9/00* (2006.01)
*H04N 5/217* (2011.01)
(Continued)

(52) U.S. Cl.
CPC ................ *H04N 9/045* (2013.01); *G06T 5/006* (2013.01); *H04N 1/60* (2013.01); *H04N 1/6027* (2013.01); *H04N 5/3572* (2013.01); *H04N 9/646* (2013.01); *G02B 15/14* (2013.01)

(58) Field of Classification Search
CPC ..... H04N 9/646; H04N 9/045; H04N 1/6027; H04N 1/60; H04N 5/208; H04N 5/225; H04N 5/238; G06T 5/001; G06T 5/003; G06T 5/006; G02B 7/36; G02B 15/14
USPC .......... 382/167, 254, 260, 274, 298; 345/589, 345/660; 348/207.99, 241
See application file for complete search history.

(56) References Cited

U.S. PATENT DOCUMENTS 4,663,655 A * 5/1987 Freeman ........................ 348/242
4,774,565 A * 9/1988 Freeman ........................ 348/242
(Continued)

FOREIGN PATENT DOCUMENTS

CN 1653823 A 8/2005
CN 101500077 A 8/2009
(Continued)

OTHER PUBLICATIONS

Using Adobe Photoshop CS4, Mar. 2, 2011, p. 1, 81, 101, 189, XP055056364.Retrived from the Internet: URL: http: // www.4shared.com/office/yZw82i4f / PhotoShop_CS4_Help.html1.
(Continued)

*Primary Examiner* — Kanjibhai Patel
(74) *Attorney, Agent, or Firm* — Cowan, Liebowitz & Latman, P.C.

(57) ABSTRACT

An image processing apparatus which enables to suppress coloring in an image after image recovery processing, and a control method for the image processing apparatus are disclosed. After the chromatic difference of magnification of an optical imaging system is corrected, a first value relating to coloring is obtained before application of an image recovery filter. Then, an image recovery filter which, preferably, does not correct a chromatic difference of magnification and is based on a function indicating the aberrations of the optical imaging system is applied. A second value associated with coloring is obtained from the image after application of the image recovery filter. According to the difference between the first and second values obtained before and after application of the image recovery filter respectively, pixel value correction for correcting coloring is performed.

23 Claims, 15 Drawing Sheets

(51) Int. Cl.
*H04N 9/04* (2006.01)
*G06T 5/00* (2006.01)
*H04N 1/60* (2006.01)
*H04N 5/357* (2011.01)
*H04N 9/64* (2006.01)
*G02B 15/14* (2006.01)

(56) References Cited

U.S. PATENT DOCUMENTS

| | | | | |
|---|---|---|---|---|
| 5,739,966 | A * | 4/1998 | Tanaka | 359/779 |
| 6,088,059 | A * | 7/2000 | Mihara et al. | 348/335 |
| 7,053,908 | B2 * | 5/2006 | Saquib et al. | 345/589 |
| 7,768,567 | B2 * | 8/2010 | Azuma | 348/335 |
| 7,918,555 | B2 * | 4/2011 | Sverdrup et al. | 351/159.73 |
| 8,565,555 | B2 * | 10/2013 | Kotani | 382/299 |
| 8,605,163 | B2 * | 12/2013 | Hatakeyama | 348/222.1 |
| 2009/0189997 | A1 | 7/2009 | Stec et al. | |
| 2010/0079615 | A1 | 4/2010 | Hatakeyama | 348/223.1 |
| 2010/0103284 | A1 | 4/2010 | Sugimori | |
| 2011/0193997 | A1 * | 8/2011 | Hatakeyama | 348/241 |
| 2011/0242373 | A1 * | 10/2011 | Inoue et al. | 348/242 |

FOREIGN PATENT DOCUMENTS

| | | |
|---|---|---|
| CN | 101527858 A | 9/2009 |
| EP | 2083388 A2 | 7/2009 |
| EP | 2099229 A1 | 9/2009 |
| JP | 10-165365 A | 6/1998 |
| JP | 3532368 | 5/2004 |
| JP | 2008-042874 A | 2/2008 |
| JP | 2009-153013 A | 7/2009 |
| JP | 2010-086138 A | 4/2010 |
| JP | 2010-087671 A | 4/2010 |
| WO | 2006/093266 A | 9/2006 |

OTHER PUBLICATIONS

Mar. 20, 2013 European Search Report of which is enclosed of the European Patent Application No. 12182461.9, which is a counterpart application of the related U.S. Appl. No. 13/591,609.

Apr. 30, 2014 Chinese Office Action, of which is enclosed with an English Translation, that issued in Chinese Patent Application No. 201210320880.1.

Using Adobe Photoshop CS4, Mar. 2, 2011, p. 1, 81, 101, 119, 214, 353, 354, 355, 356, 357, 358, XP055055442. Revived from the Internet: URL:http: // www.4shared.com/office/yZw82i4f / PhotoShop_CS4_Help.html1.

Mar. 13, 2013 European Search Report of which is enclosed of the counterpart European Patent Application No. 12182462.7.

U.S. Appl. No. 13/591,609, filed Aug. 22, 2012, Akira Kano.

The above foreign patent documents were cited in the Apr. 17, 2015 Japanese Office Action, which is enclosed without an English Translation, that issued in Japanese Patent Application No. 2011-189326.

* cited by examiner

IMAGE RECOVERY FILTER

TAP VALUE

TAP

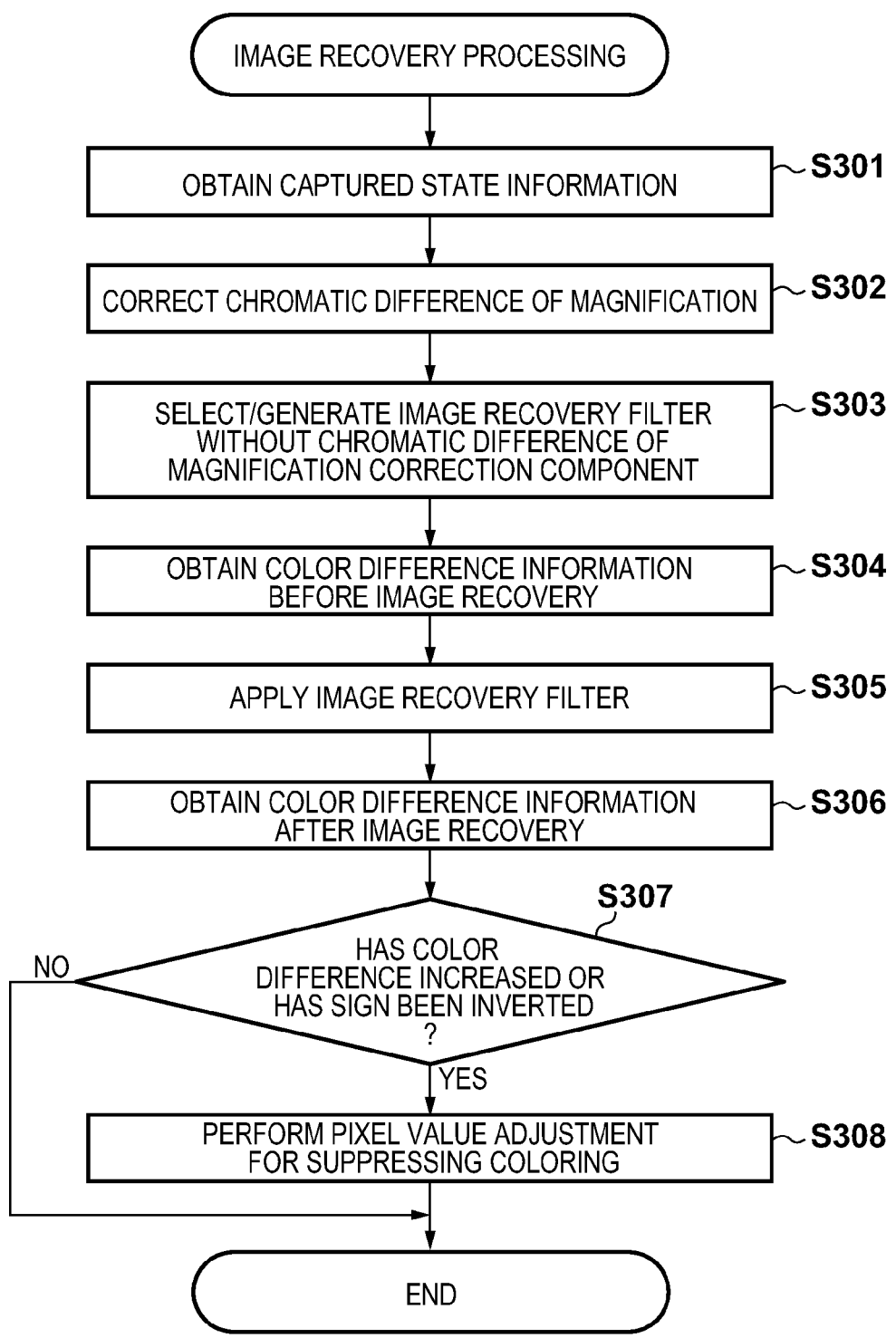

IN-FOCUS STATE (USE IMAGE RECOVERY FILTER WITHOUT
CHROMATIC DIFFERENCE OF MAGNIFICATION CORRECTION COMPONENT)

OUT-OF-FOCUS STATE (USE IMAGE RECOVERY FILTER WITHOUT
CHROMATIC DIFFERENCE OF MAGNIFICATION CORRECTION COMPONENT)

OUT-OF-FOCUS STATE (USE IMAGE RECOVERY FILTER WITH
CHROMATIC DIFFERENCE OF MAGNIFICATION CORRECTION COMPONENT)

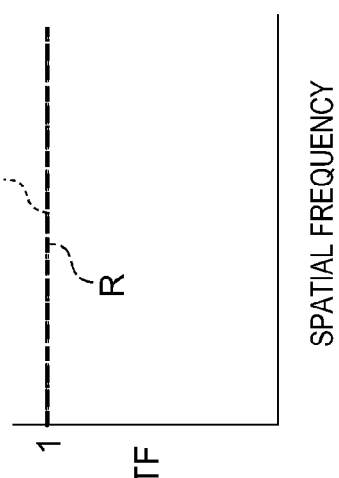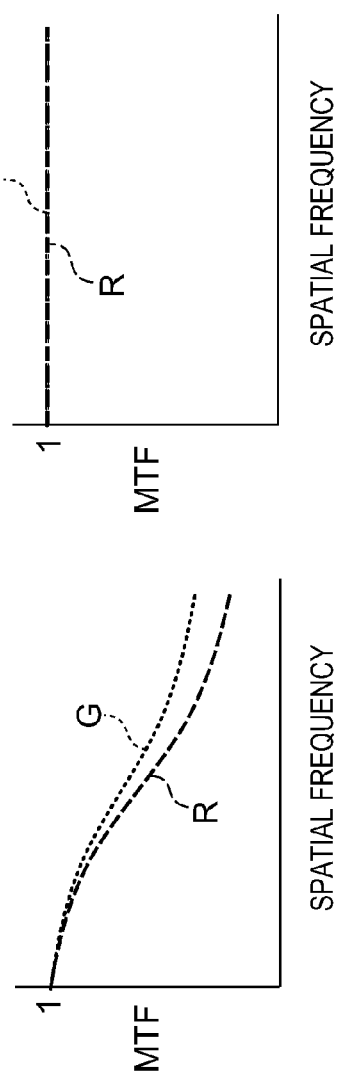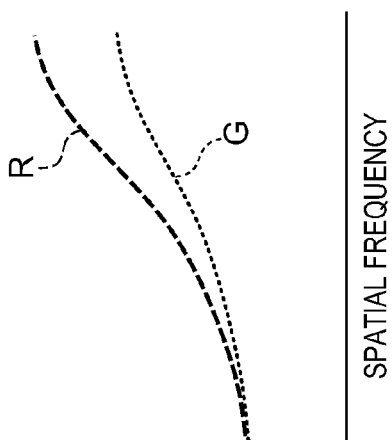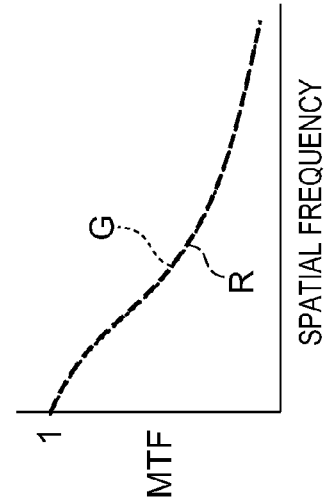

IN-FOCUS STATE (CORRECT CHROMATIC DIFFERENCE OF MAGNIFICATION BEFORE AND AFTER APPLICATION OF IMAGE RECOVERY FILTER)

IN-FOCUS STATE (DO NOT CORRECT CHROMATIC DIFFERENCE OF MAGNIFICATION AFTER APPLICATION OF IMAGE RECOVERY FILTER)

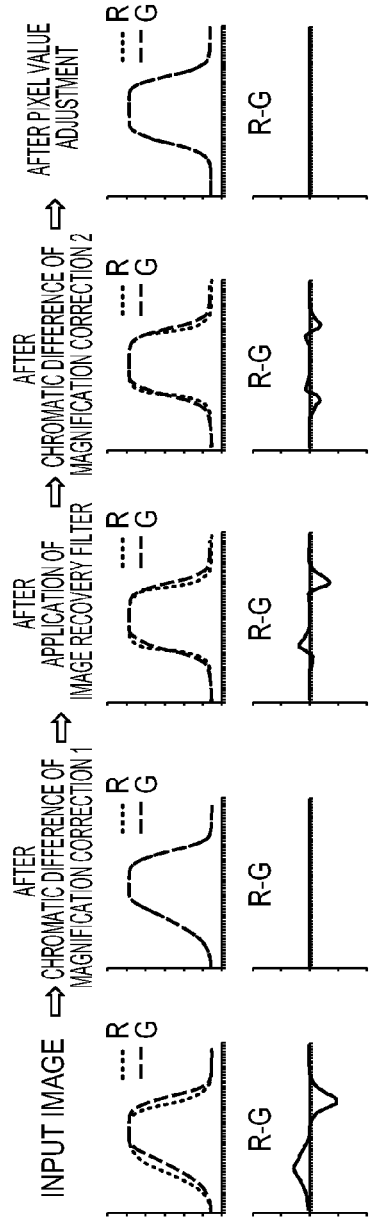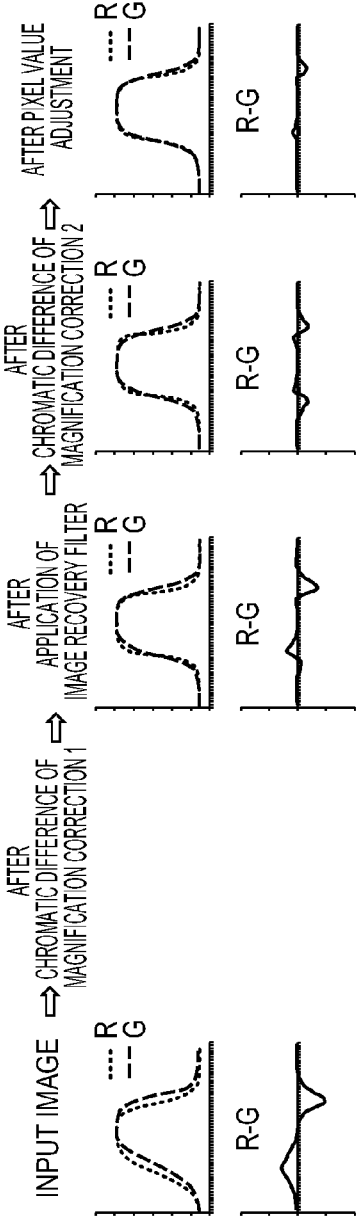

IMAGE PROCESSING APPARATUS, IMAGE CAPTURE APPARATUS AND IMAGE PROCESSING METHOD

BACKGROUND OF THE INVENTION

1. Field of the Invention

The present invention relates to an image processing apparatus, an image capture apparatus, and an image processing method, and more particularly, to an image correction technique using image recovery processing.

2. Description of the Related Art

The image quality of an image obtained by capturing an object by an image capture apparatus degrades especially due to the aberrations of an optical imaging system. For example, blur of an image indicates degradation in image quality due to the spherical aberration, coma aberration, curvature of field, astigmatism, and the like of the optical imaging system. By ignoring an influence of diffraction as the characteristic of a light wave, light beams coming from one point of the object converge to one point (focal point) of the same size on an imaging plane by an optical imaging system without aberrations. The focal point, however, actually spreads due to the aberrations of the optical imaging system in addition to the influence of diffraction.

The point spread function (PSF) of the optical imaging system represents an intensity distribution around the focal point, that is, blur of the image due to diffraction and the aberrations of the optical imaging system, which is, therefore, referred to as a blur component. The blur component indicates not blur due to an out-of-focus state but blur caused by the diffraction of light and the aberrations of the optical imaging system even in an in-focus state.

Color fringing, in a color image, due to the axial chromatic aberration, color spherical aberration, and color coma aberration of the optical imaging system may be caused by a variation in degree of blur depending on the wavelength of light. A color deviation in the lateral direction due to the chromatic difference of magnification of an optical system may indicate misregistration or a phase shift due to a variation in imaging magnification depending on the wavelength of light.

An optical transfer function (OTF) obtained by performing a Fourier transform for the point spread function (PSF) serves as frequency component information of the aberrations, and is represented by a complex number. The absolute value of the optical transfer function (OSF), that is, the amplitude component will be referred to as an MTF (Modulation Transfer Function), and the phase component will be referred to as a PTF (Phase Transfer Function). The MTF and PTF are the frequency characteristics of the amplitude component and phase component of image degradation due to the aberrations, respectively. The phase component PTF is represented as a phase angle by:

$$PTF = \tan^{-1}(Im(OTF)/Re(OTF)) \quad (1)$$

where Re(OTF) and Im(OTF) represent the real part and imaginary part of the optical transfer function, respectively.

As described above, since the optical transfer function of the optical imaging system degrades both the amplitude component and phase component of the image, respective points of an object image are blurred asymmetrically with respect to the focal point, similarly to a case in which a coma aberration occurs.

The chromatic difference of magnification indicates a phenomenon in which an imaging position shifts due to a variation in imaging magnification depending on the wavelength of light. An image sensor is generally provided with a RGB color mosaic filter, and each pixel is configured to obtain one of R, G, and B color components. In addition to misregistration of an imaging position between R, G, and B wavelengths, misregistration of an imaging position for each wavelength, that is, spread of an image due to a phase shift occurs within each obtained color component. Although the chromatic difference of magnification does not exactly indicate a color deviation due to a simple parallel shift, the color deviation and chromatic difference of magnification are used as synonyms in this specification unless otherwise specified.

There is known a method, called an image recovery method or image restoration method, of correcting degradation in the amplitude component (MTF) and the phase component (PTF) using information of the optical transfer function (OTF) of an optical imaging system. Processing of correcting degradation in an image using information of the optical transfer function of an optical imaging system, therefore, will be referred to as image recovery processing hereinafter.

An overview of the image recovery processing will now be described. Let g(x, y) be a degraded image, f(x, y) be an original image, and h(x, y) be a point spread function obtained by performing inverse Fourier transform for the optical transfer function of the optical imaging system. Then, $$g(x,y) = h(x,y) * f(x,y) \quad (2)$$

where an operator "*" represents convolution and (x, y) represents coordinates on the image.

Fourier transform is performed for equation (2) to obtain a display format on a two-dimensional frequency plane, resulting in the format of a product for each frequency, as represented by:

$$G(u,v) = H(u,v) \cdot F(u,v) \quad (3)$$

where H represents an optical transfer function obtained by performing Fourier transform for the point spread function, and (u, v) represents coordinates on the two-dimensional frequency plane, that is, a frequency.

To obtain the original image from the captured degraded image, it is only necessary to divide both sides of equation (3) by H, as represented by:

$$G(u,v)/H(u,v) = F(u,v) \quad (4)$$

The original image f(x, y) is obtained as a recovered image by performing inverse Fourier transform for F(u, v) to return to the real plane.

Let R be 1/H in above equation having undergone inverse Fourier transform. It is then possible to obtain the original image by executing convolution processing for the image on the real plane, as indicated by:

$$g(x,y) * R(x,y) = f(x,y) \quad (5)$$

R(x, y) will be referred to as an image recovery filter. An image recovery filter to be applied to a two-dimensional image is generally a two-dimensional filter having a tap (cell) corresponding to each pixel of the image. Furthermore, as the number of taps (cells) of the image recovery filter increases, the recovery accuracy generally improves. The actual number of taps is set according to the required image quality, the image processing capability, the aberration characteristics, and the like. Since the image recovery filter is based on the optical transfer function which reflects the aberration characteristics of the optical imaging system, degradation in frequency component and phase component can be corrected with high accuracy. Such an image recovery filter is fundamentally different from a two-dimensional filter like an edge enhancement filter (high-pass filter) having three taps in each of the horizontal and vertical directions.

For example, Japanese Patent No. 3532368 discloses a method of canceling blur of an image in a portion, other than an in-focus range, of an image captured by a fluorescence endoscope for observing an inside of a living body, using a point spread function according to a fluorescence wavelength to be used.

Note that since an actual image includes a noise component, using an image recovery filter created by obtaining the complete reciprocal of the optical transfer function amplifies the noise component, thereby making it difficult to obtain a high-quality recovered image. The image recovery filter created by obtaining the complete reciprocal of the optical transfer function recovers degradation in amplitude by the optical imaging system by correcting (increasing) the MTF of the optical imaging system so that the MTF becomes 1 for all frequencies. If the amplitude component of the image has been added with the amplitude of noise, the power spectrum of the noise increases as the MTF increases, thereby undesirably amplifying the noise according to the recovery degree (recovery gain) of the MTF.

This phenomenon can be represented by:

$$G(u,v)=H(u,v) \cdot F(u,v)+N(u,v) \tag{6}$$

$$G(u,v)/H(u,v)=F(u,v)+N(u,v)/H(u,v) \tag{7}$$

where N represents the noise component.

There is a well known method of suppressing noise in a recovered image using an image recovery filter for suppressing the recovery ratio on the high frequency side of the image according to a strength ratio between an image signal and a noise signal, like a Wiener filter (to be described later in detail).

There is a well known technique of improving the image quality by performing image recovery processing using the point spread function of an optical imaging system for a captured image to correct various aberrations.

In an actual capturing operation, however, the captured state of an input image may not optimally coincide with the state of an image recovery filter to be applied.

An example is a captured image of a stereoscopic object. Since an image capture apparatus captures an image by focusing on one plane in an object space by an auto focus function or manual focusing, an object positioned in the focal plane is captured relatively sharply. Another object (including a portion of the same object, which is at a position different from the focal plane) is captured with an amount of blur corresponding to a distance from the focal plane.

If information about an object distance includes only the distance from the focal plane, an optimum image recovery filter for the object distance and the angle of view is selected or generated to be used. Consequently, since the optimum image recovery filter is applied to the in-focus object, it is possible to obtain a desired recovery result for such an object. Since, however, the image recovery filter is not optimum for an out-of-focus object, the recovery effect is obtained to some extent but blur cannot be canceled for such an object.

On the other hand, blur of an object in a photo is used as a method of producing a stereoscopic effect for an object or representing an object of interest. For example, there is a photographic technique in which a telephoto lens having a shallow depth of field is used to focus on a main object, and the background is intentionally blurred. In consideration of the presence of such a photographic technique, the above-described image recovery processing in which an in-focus object is made sharper and an out-of-focus object remains blurred may be appropriate.

If, however, image recovery processing is executed using an image recovery filter which is optimum for an object at an in-focus distance and is not optimum for an object at an out-of-focus distance, coloring may occur in the object at the out-of-focus distance. Coloring herein indicates that a color (false color) which the object does not have appears at the edge portion of the object (out-of-focus object) at the out-of-focus distance of the image after the image recovery processing because the relationship between the degrees of blur of the respective color components of the image before the image recovery processing is different from that after the image recovery processing.

Such coloring may also occur in an operation other than an operation of capturing a stereoscopic object. Coloring essentially occurs when the state of aberrations in capturing an image is different from that of aberrations which are corrected by an image recovery filter to be applied, regardless of whether an object is in focus.

As a method of reducing such coloring, there is provided a method of correcting the color of an image after image recovery processing based on the color information of an image before the image recovery processing. That is, the method is for reducing coloring due to the image recovery processing by determining a change in color due to the image recovery processing in each pixel of the image. There is already coloring in the captured image before the image recovery processing due to various aberrations of the optical imaging system, such as color fringing caused by an axial chromatic aberration, color spherical aberration, or color coma aberration, and a color deviation caused by a chromatic difference of magnification. If there is such coloring in the image before the image recovery processing, a method based on the color information of the image before the image recovery processing cannot sufficiently suppress coloring in the image after the image recovery processing in some cases.

Coloring that occurs in the image recovery processing to improve the image quality is degradation in image quality which cannot be ignored, and needs to be sufficiently suppressed.

The method disclosed in Japanese Patent No. 3532368 attempts to complement the shallow depth of field of the optical imaging system by executing the image recovery processing for an out-of-focus range of a captured image. In the image recovery processing described in Japanese Patent No. 3532368, even though it is possible to improve the sharpness of the out-of-focus range, if there is coloring in the captured image before the image recovery processing, coloring that occurs in an image after the image recovery processing cannot be sufficiently suppressed.

SUMMARY OF THE INVENTION

The present invention has been made in consideration of the aforementioned problems of the conventional technique, and provides an image processing apparatus, an image capture apparatus, and image processing method which enable suppression of coloring in an image after image recovery processing.

According to an aspect of the present invention, there is provided an image processing apparatus for correcting for degradation in image quality due to aberrations of an optical imaging system of an image capture apparatus in an image captured by the image capture apparatus, comprising: a first chromatic difference of magnification correction unit configured to perform correction of a chromatic difference of magnification of the optical imaging system for the image; a first obtaining unit configured to obtain a first value related to coloring of the image in which the chromatic difference of magnification has been corrected; an image recovery processing unit for applying, to the image in which the chromatic difference of magnification has been corrected, an image recovery filter based on a function representing the aberrations of the optical imaging system; a second obtaining unit configured to obtain a second value related to coloring of the image which has to which the image recovery filter has been applied; and a pixel value correction unit configured to correct a pixel value of the image which has been applied with the image recovery filter according to a difference between the first and second values obtained by the first obtaining unit and the second obtaining unit.

According to another aspect of the present invention, there is provided an image capture apparatus comprising: an optical imaging system for imaging an optical image of an object; an image sensor for capturing the optical image; and an image processing apparatus according to the present invention.

According to further aspect of the present invention, there is provided an image processing method of correcting for degradation in image quality due to aberrations of an optical imaging system of an image capture apparatus in an image captured by the image capture apparatus, comprising: a step of performing correction of a chromatic difference of magnification of the optical imaging system for the image; a first obtaining step of obtaining a first value related to coloring of the image in which the chromatic difference of magnification has been corrected; a step of applying, to the image in which the chromatic difference of magnification has been corrected, an image recovery filter based on a function representing the aberrations of the optical imaging system; a second obtaining step of obtaining a second value related to coloring of the image which has been applied with the image recovery filter; and a step of correcting a pixel value of the image which has been applied with the image recovery filter according to a difference between the first and second values obtained in the first obtaining step and the second obtaining step.

Further features of the present invention will become apparent from the following description of embodiments with reference to the attached drawings.

BRIEF DESCRIPTION OF THE DRAWINGS

FIG. 7 is a flowchart illustrating the image recovery processing according to a first embodiment of the present invention;

FIGS. 11A to 11D are graphs each showing an example of the MTFs of an optical imaging system of the image capture apparatus according to the embodiment of the present invention and the spatial frequency characteristics of the MTFs after application of the image recovery filter;

FIG. 11E is a graph showing the rates of increase/decrease (recovery gains) of the MTFs of the image capture apparatus according to the embodiment of the present invention, which are obtained by applying the image recovery filter;

FIGS. 13A to 13D are views for explaining the operation and effect of the image recovery processing according to the second embodiment of the present invention.

DESCRIPTION OF THE EMBODIMENTS

Embodiments of the present invention will now be described in detail in accordance with the accompanying drawings.

An overview of image recovery processing according to an embodiment of the present invention, and chromatic difference of magnification detection/correction processing will be described first.

(Image Recovery Processing)

Similar to the above-described conventional image recovery processing, an image recovery filter is basically used. The following equation (8) indicates the characteristics of a Wiener filter as an example usable as an image recovery filter.

$$M(u, v) = \frac{1}{H(u, v)} \frac{|H(u, v)|^2}{|H(u, v)|^2 + SNR^2} \quad (8)$$

where M(u, v) represents the frequency characteristic of the Wiener filter, |H(u, v)| represents the absolute value (MTF) of an optical transfer function, and SNR represents the strength ratio between an image signal and a noise signal. As is apparent from the above equation, in this method, for each frequency, a recovery gain (recovery degree) is suppressed as the MTF decreases, and the recovery gain is augmented as the MTF increases. Since, in general, the MTF of an optical imaging system is large on the low frequency side and is small on the high frequency side, the recovery gain on the high frequency side of an image is substantially suppressed.

Figure 2A:
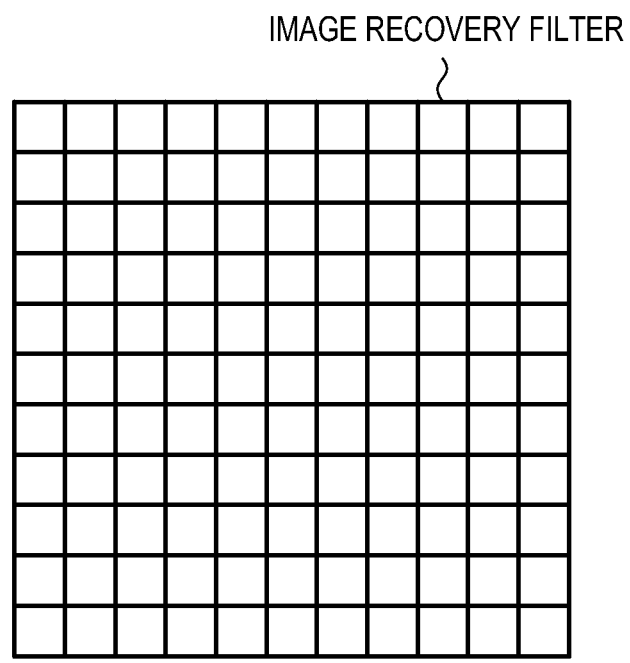
FIGS. 2A and 2B are views for explaining an image recovery filter according to an embodiment of the present invention.
Figure 2B:
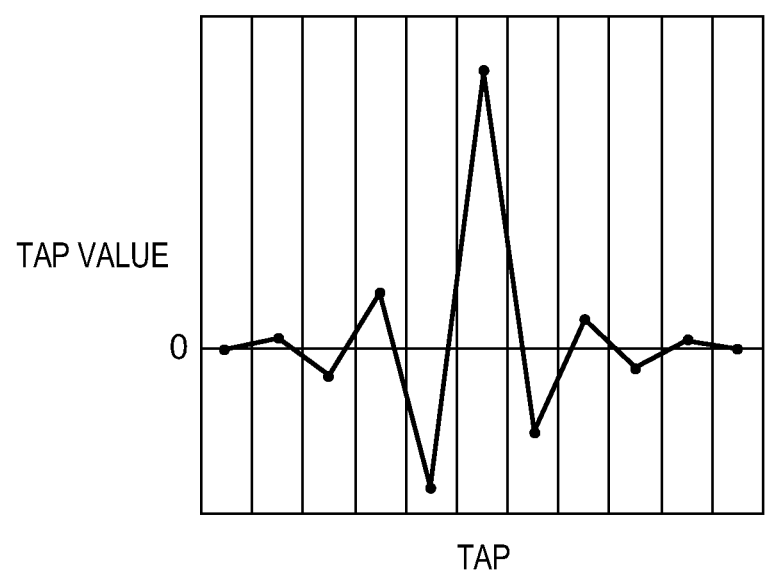

As described above, when the image recovery filter is applied to a two-dimensional image, it is formed as a two-dimensional filter having taps corresponding to pixels, and the number of taps can be determined based on the aberration characteristics of the optical imaging system and required recovery accuracy. FIG. 2A schematically shows, as an example, an image recovery filter formed as a two-dimensional filter having 11×11 taps, that is, 11 taps in each of the horizontal and vertical directions. Although the value (coefficient value) of each tap is not shown in FIG. 2A, FIG. 2B shows an example of distribution of the tap coefficients of one horizontal line of the image recovery filter. The distribution of the values (coefficient values) of the taps of the image recovery filter serves to return a point spread function which spatially spreads due to the aberrations of the optical imaging system to ideally an original one point (when the influence of diffraction is ignored).

The tap coefficient value of the image recovery filter is used for convolution processing (a convolution integral operation, a product-sum operation) executed for each pixel in a step of the image recovery processing. In the convolution processing, a pixel to be processed is made to coincide with the central tap of the image recovery filter to apply the image recovery processing to the signal value of the pixel to be processed. At each tap position of the image recovery filter, the product of a corresponding pixel signal value and tap coefficient value is obtained, and the signal value of the pixel to be processed is substituted by the sum of the products.

Figure 3A:
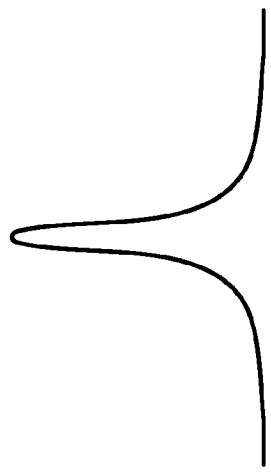
FIGS. 3A to 3D are graphs for explaining the characteristics in the real space and frequency space of image recovery processing according to an embodiment of the present invention.
Figure 3B:
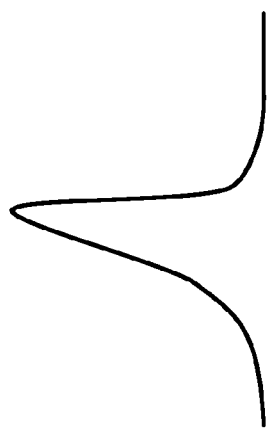
Figure 3C:
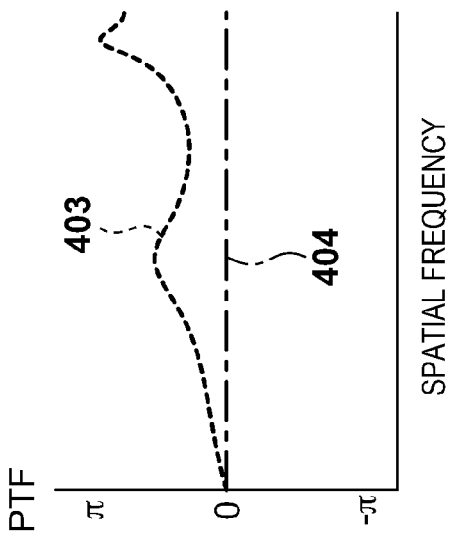
Figure 3D:
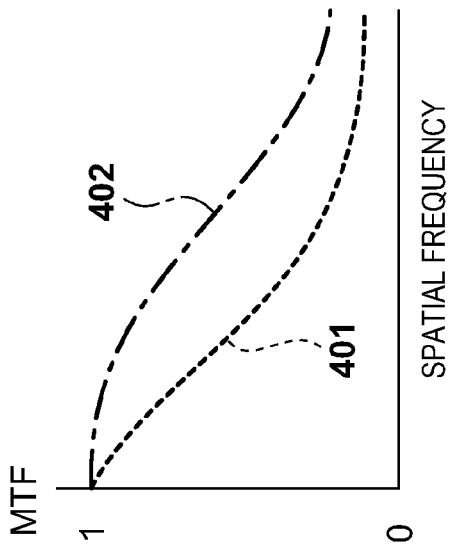

The characteristics in the real space and frequency space of the image recovery processing will be described with reference to FIGS. 3A to 3D. FIG. 3A shows a point spread function before the image recovery processing, and FIG. 3B shows a point spread function after the recovery processing. Referring to FIG. 3C, reference numeral 401 denotes an MTF before the image recovery processing; and 402, an MTF after the image recovery processing. Referring to FIG. 3D, reference numeral 403 denotes a PTF before the image recovery processing; and 404, a PTF after the image recovery processing. As is apparent from FIG. 3A, the point spread function before the image recovery processing asymmetrically spreads, which causes a corresponding PTF to have a non-zero value (denoted by reference numeral 403 in FIG. 3D). Since the image recovery processing amplifies the MTF as indicated by the MFP 402 in FIG. 3C, and corrects the PTF to zero as indicated by the PTF 404 in FIG. 3D, the point spread function after the image recovery processing is symmetric and sharp as shown in FIG. 3B.

It is possible to obtain an image recovery filter by performing inverse Fourier transform for a function which has been designed based on the inverse function (1/H) of the optical transfer function of the optical imaging system. Although the above-described Wiener filter can be used as an image recovery filter, another filter may be used. If the Wiener filter is used, it is possible to create an image recovery filter in a real space, which is to be used for convolution processing, by performing inverse Fourier transform for the inverse function of the optical transfer function.

Figure 4A:
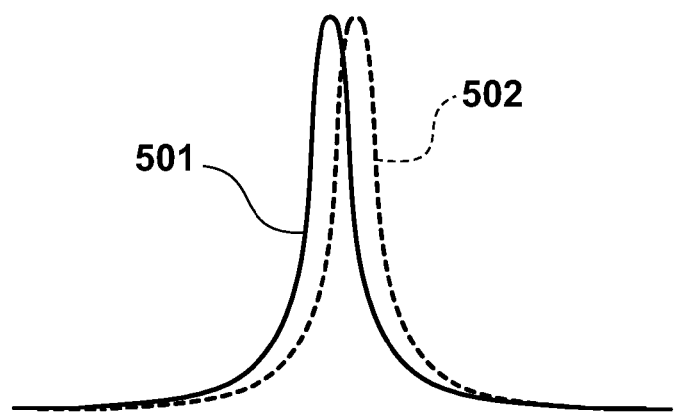
FIGS. 4A and 4B are graphs for explaining generation of an image recovery filter in consideration of a chromatic difference of magnification.
Figure 4B:
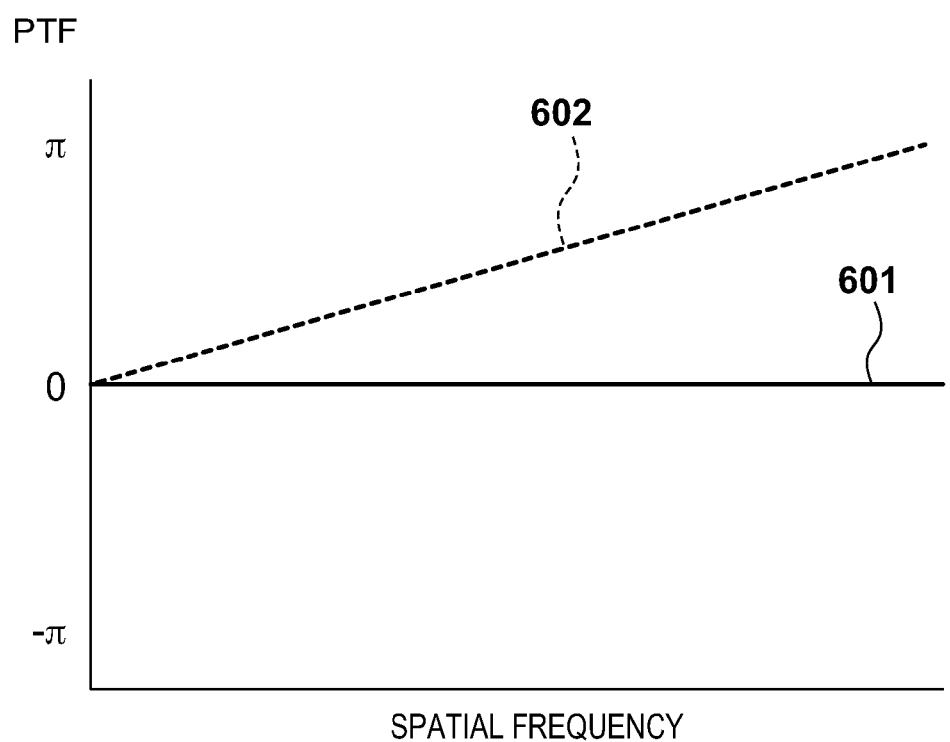

Generation of an image recovery filter in consideration of a chromatic difference of magnification will be described next. A curve 502 in FIG. 4A represents two color components which have been imaged as a point spread function with the same shape as that of a curve 501 at a position obtained by performing translation with reference to an imaging position of the curve 501. FIG. 4B shows PTFs at this time. Straight lines 601 and 602 in FIG. 4B correspond to the curves 501 and 502 in FIG. 4A. The straight line 602 represents that the phase has a slope. The image recovery filter can correct a linear PTF as shown in FIG. 4B and a nonlinear PTF like the PTF 403 of FIG. 3D, as represented by the straight line 601 in FIG. 4B, since the original optical transfer function includes such PTFs.

It is possible to generate an image recovery filter which does not correct a translation component of a chromatic difference of magnification by generating an image recovery filter based on an optical transfer function for which a linear component has previously been removed from a PTF. On the other hand, if a component of a chromatic difference of magnification is removed in the real space, it is possible to generate an optical transfer function for which a component of a chromatic difference of magnification has been removed, by generating a point spread function for which the curve 502 of FIG. 4A has been translated to the position of the curve 501 to reduce a difference, and performing Fourier transform for the generated point spread function. Since, actually, the shape of the point spread function of the curve 501 is different from that of the point spread function of the curve 502, a method of causing the barycenters of the curves to coincide with each other or a method of minimizing the root mean square value of the difference between the curves 501 and 502 can be used to align the curves. By generating an image recovery filter based on the optical transfer function, it is possible to generate an image recovery filter which does not correct a translation component of a chromatic difference of magnification.

By applying the image recovery filter which does not correct a component of a chromatic difference of magnification, it becomes possible to process the chromatic difference of magnification independently of the image recovery processing. That is, it becomes possible to perform processing by separating correction and sharpening of asymmetrical aberrations for each color component from correction of a color deviation as a translation component of the chromatic difference of magnification.

Note that since the optical transfer function varies depending on the image height (the position of an image) of the optical imaging system even in the same captured state (the same zoom position and the same diameter of an aperture stop), the image recovery filter is desirably changed and used according to the image height.

The overview of the image recovery processing has been described.

(Detection and Correction of Chromatic Difference of Magnification)

It is possible to calculate a correction amount of a chromatic difference of magnification based on the design values of the optical imaging system, such as the linear component of a PTF and the shape of a point spread function, as described above.

Figure 5:
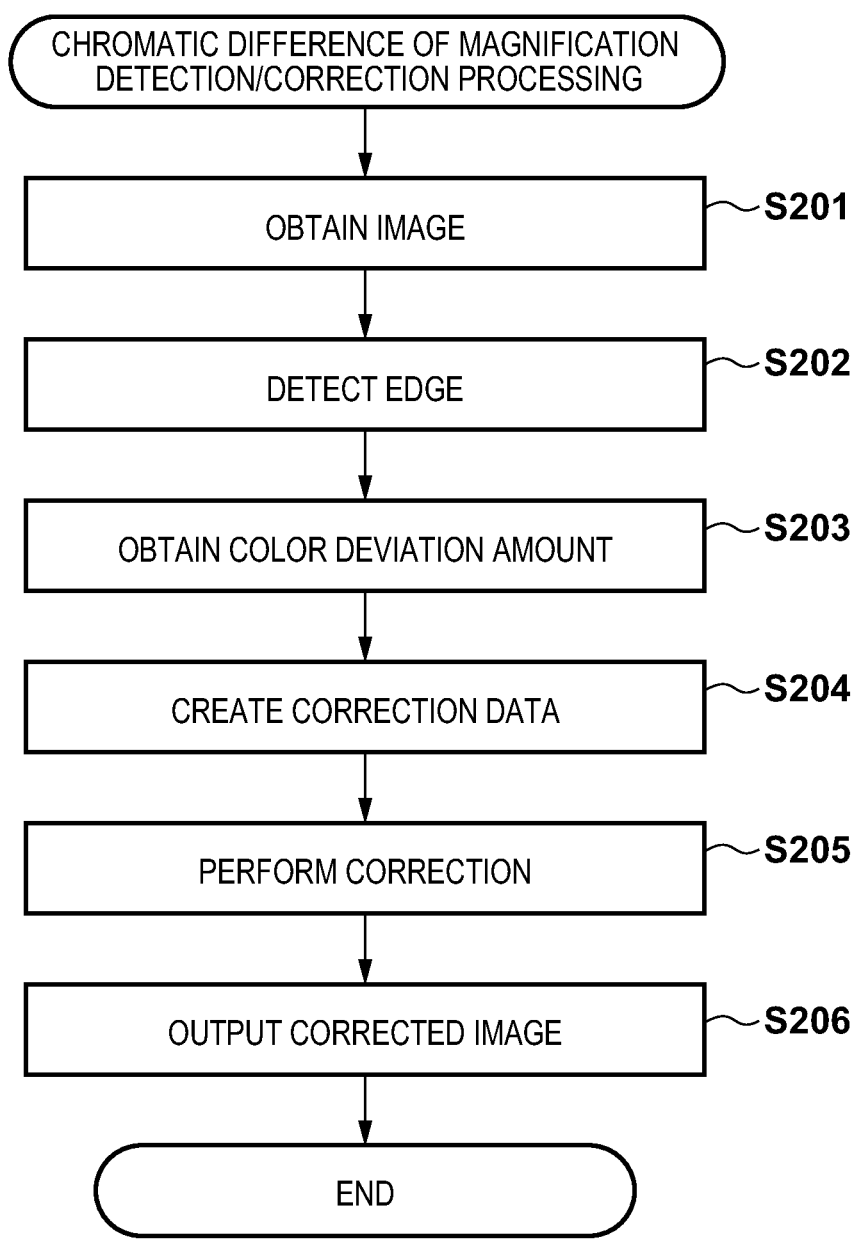
FIG. 5 is a flowchart illustrating chromatic difference of magnification detection/correction processing according to an embodiment of the present invention.

The appearance of a chromatic difference of magnification on an image may change due to a manufacturing variation of the optical imaging system and a variation in spectrum of a light source in capturing an image. As a method of dealing with such a change, there is a method of detecting a chromatic difference of magnification from an image. A method of detecting a chromatic difference of magnification from an image and correcting it will be described with reference to FIG. 5. As will be described later, in the image capture apparatus (FIG. 1) according to the embodiment, an image recovery processing unit 111 of an image processing unit 104 can execute the following processing, which will be explained here as a general procedure.

In step S201, a captured image is obtained as an input image.

In step S202, an edge portion where a significant color deviation due to a chromatic difference of magnification is detected from the image. To detect an edge, a Y (luminance) plane is used. By performing detection by limiting to edges where the pixel value significantly changes in the radial direction from the optical center, it becomes possible to obtain a color deviation amount with high accuracy. Since the color deviation due to the chromatic difference of magnification appears as fringing in the Y plane, an edge having a width of some extent, where the pixel value monotonously increases or decreases for a plurality of consecutive pixels, can be regarded to as a target of the edge detection.

In step S203, a color deviation amount is obtained at each edge detected in step S202. An attempt to simplify the processing is made by applying, according to the positional relationship between the optical center and each edge, one of the vertical direction, lateral direction, obliquely upward direction, and obliquely downward direction as the direction of the color deviation to be processed. A correlation between color components is used to obtain a color deviation amount at each edge. It is possible to obtain a color deviation amount by, for example, determining the sum of absolute difference values between the color components. While moving an R plane (or B plane) in the color deviation direction with respect to a G plane, a location where the sum of the absolute difference values between the color components is smallest is searched for in pixels around the detected edge. Based on a position before movement and the detected location where the sum of the absolute difference values is smallest, it is possible to obtain a color deviation amount in the R plane (or B plane) with respect to the G plane.

The color deviation amount has a negative value when the R plane (or B plane) has been shifted in a direction toward the optical center with respect to the G plane, and has a positive value when the R plane (or B plane) has been shifted in a direction away from the optical center with respect to the G plane.

In step S204, correction data is created by obtaining the relationship between the image height and a color deviation based on the image height of each edge detected in step S202 and the color deviation amount at each edge, which has been obtained in step S203.

The image height indicates a distance from a pixel corresponding to the optical center (to be simply referred to as an optical center hereinafter).

A procedure of creating correction data will be described in detail below.

(1) Let L be the image height of the edge detected in step S202 and D be the color deviation amount obtained in step S203. Then, a color deviation ratio M with respect to the image height is obtained by:

$$M=D/L \quad (9)$$

Figure 6A:
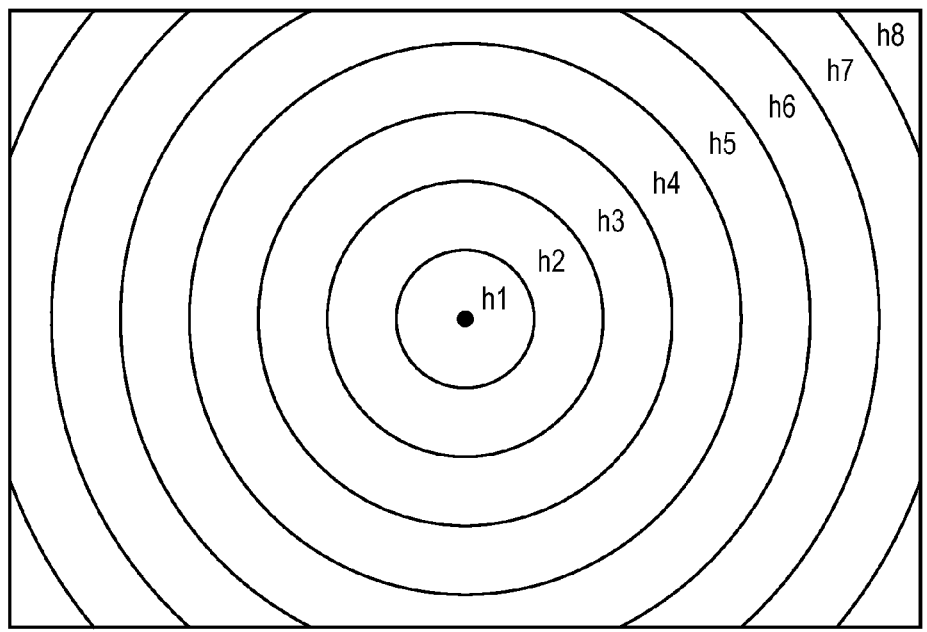
FIGS. 6A and 6B are views for explaining a chromatic difference of magnification correction data generation method according to an embodiment of the present invention.

(2) An image is divided into a plurality of regions (denoted by reference symbols h1 to h8 in this case) according to the image height as shown in FIG. 6A, and a region to which the edge belongs is selected.

(3) Operations (1) and (2) are performed for each edge detected in the image, color deviation ratios M are accumulated for each region divided according to the image height, and an average of the color deviation ratios M for each region is obtained as a color deviation ratio for each region.

Figure 6B:
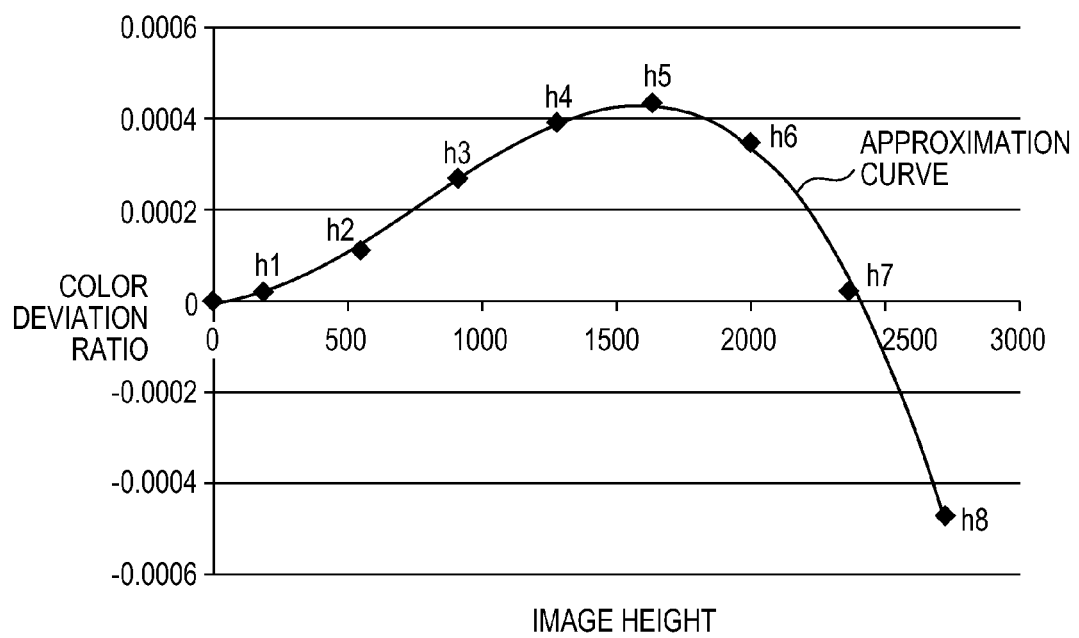

(4) A high-order polynomial approximate equation F(l) representing the relationship between an image height l and the color deviation ratio M is calculated based on the image height and color deviation ratio as shown in FIG. 6B, and is used as correction data. FIG. 6B shows a case in which correction data is calculated by a three-order polynomial equation represented by:

$$M=F(l)=al^3+bl^2+cl \quad (10)$$

where a, b, and c respectively represent coefficients.

Note that detection of an edge and obtaining of a color deviation amount may be performed for all edges within the image. It is also possible to improve the efficiency of the processing while maintaining the reliability by, for example, terminating an operation of detecting an edge and obtaining a color deviation amount when color deviation ratios the number of which is equal to or larger than a given threshold are accumulated in each region divided according to the image height.

By using only a region, where a corresponding edge has been found, of the plurality of regions divided according to the image height for calculation of a high-order polynomial approximate equation, it becomes possible to create correction data even if there is a region where no corresponding edge is found.

In step S205, the color deviation is corrected using the correction data created in step S204. Correction is performed by shifting the pixel position of a target color component. More specifically, for example, the following method can perform correction.

At a pixel (X, Y) in a plane (R plane, B plane) to be corrected, a color deviation ratio M at the pixel (X, Y) is obtained based on an image height L of the pixel (X, Y) and the correction data. Assume that a pixel corresponding to the optical center has coordinates (0, 0).

$$M=F(L) \quad (11)$$

Coordinates (X1, Y1) of a pixel to be generated by color deviation correction are obtained by:

$$X1=M\times X \quad (12)$$

$$Y1=M\times Y \quad (13)$$

A pixel value corresponding to the coordinates (X1, Y1) in the plane to be corrected is generated by general interpolation processing, and is set as the pixel value of the pixel (X, Y). These operations are executed for all pixels, thereby performing color deviation correction.

An overview of processing of creating chromatic difference of magnification correction data based on an image and performing correction has been described.

(Arrangement of Image Capture Apparatus)

Figure 1:
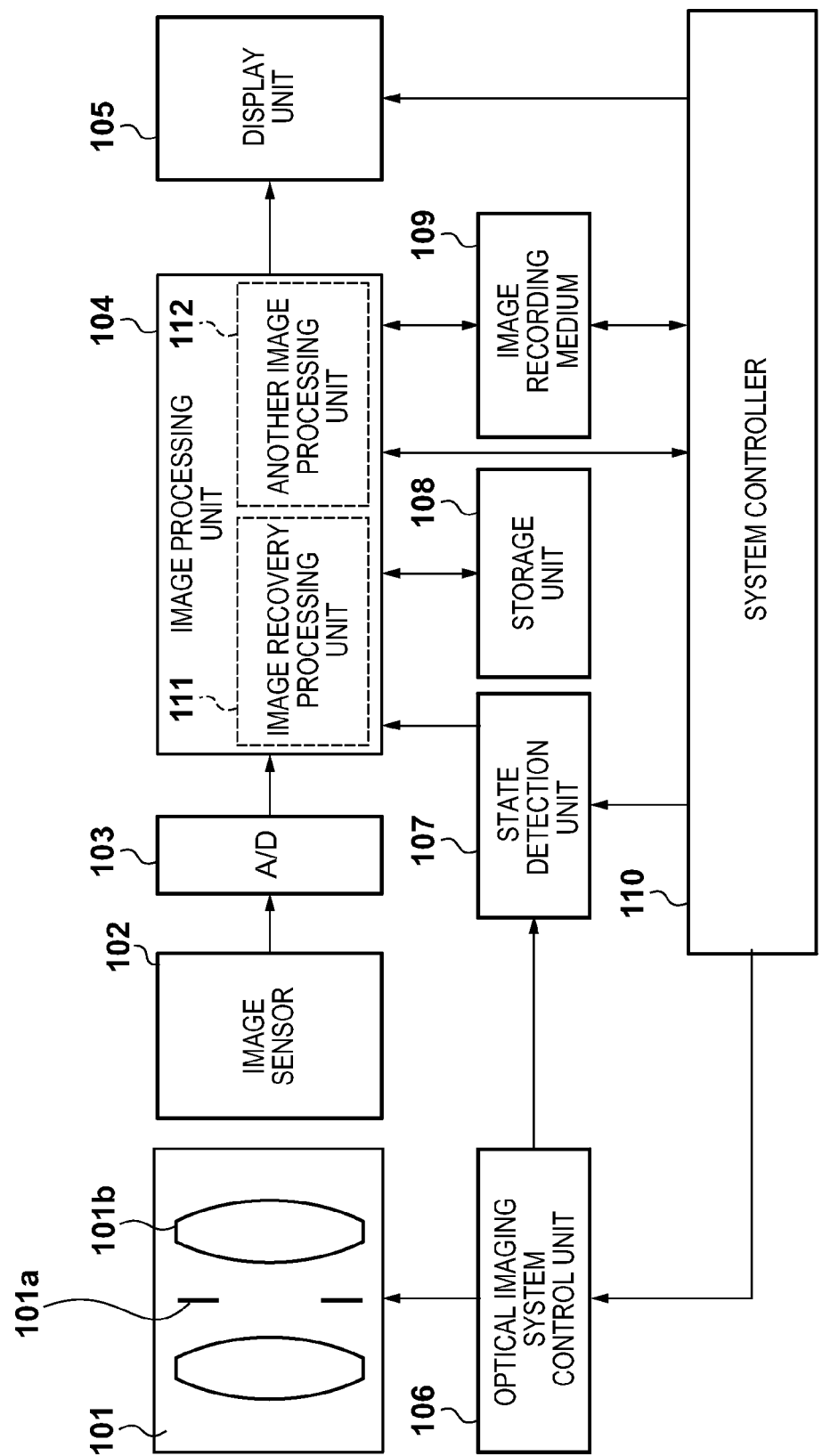
FIG. 1 is a block diagram showing an example of the arrangement of an image capture apparatus as an example of an image processing apparatus according to an embodiment of the present invention.

FIG. 1 is a block diagram showing an example of the arrangement of an image capture apparatus as an example of an image processing apparatus according to the embodiment of the present invention. In this embodiment, a case wherein an image capture apparatus including an optical imaging system and an image sensor, to which the present invention is applied will be described. However, components for generating a captured image such as an optical imaging system and image sensor are not essential in the present invention.

An optical imaging system 101 images an optical image of an object (not shown) on an image sensor 102. The image sensor 102 converts the image into an electrical signal, which is converted into a digital signal by an A/D converter 103 and is input to the image processing unit 104. The image processing unit 104 includes the image recovery processing unit 111, and another image processing unit 112 for executing image processing other than image recovery processing. The image recovery processing unit 111 obtains captured state information of the image capture apparatus from a state detection unit 107. The state detection unit 107 may obtain captured state information of the image capture apparatus directly from a system controller 110, or may obtain captured state information associated with the optical imaging system 101 from an optical imaging system control unit 106.

Then, the image recovery processing unit 111 selects an image recovery filter corresponding to the captured state from, for example, a storage unit 108, and executes chromatic difference of magnification correction processing and image recovery filter application processing for the image input to the image processing unit 104. The image recovery processing will be described in detail later. The storage unit 108 may hold information necessary for generating an image recovery filter (for example, information about a point spread function or optical transfer function) instead of the image recovery filter. In this case, the image recovery processing unit 111 selects information about a point spread function or optical transfer function corresponding to the captured state from the storage unit 108 to generate an image recovery filter corresponding to the captured state, and uses the generated image recovery filter to execute the image recovery processing. The other image processing unit 112 executes predetermined image processing such as gamma correction and color balance adjustment for the image after the image recovery processing, thereby generating an image file such as a JPEG file.

The system controller 110 stores an output image processed by the image processing unit 104 in an image recording medium 109 in a predetermined format. A display unit 105 may display an image obtained by executing predetermined processing for display for the image after the image recovery processing, or an image which has not undergone the image recovery processing or has undergone simple recovery processing.

The system controller 110 performs a series of control operations, and the optical imaging system control unit 106 mechanically drives the optical imaging system 101 (an aperture stop 101a, a focusing lens 101b, an optical zoom, and the like) in response to an instruction from the system controller 110. The system controller 110 is, for example, a programmable controller such as a CPU or MPU, and implements the overall operation of the image capture apparatus by executing a program stored in the storage unit 108. Note that although the image processing unit 104 may be implemented by hardware, at least part of the image processing unit 104 can also be implemented by the system controller 110 in a software manner.

The diameter of the aperture stop 101a is controlled as captured state setting of an F-number. The position of the focusing lens 101b is controlled by an auto focus (AF) mechanism or manual focus mechanism (not shown) to adjust its focus according to an object distance. The optical imaging system 101 may include an optical element such as a low-pass filter or infrared cut filter. Note that when an element such as a low-pass filter which influences the characteristics of an optical transfer function is used, a change in optical transfer function due to the optical element is considered in creating an image recovery filter. Since the infrared cut filter also influences the point spread function of each of R, G, and B channels, especially the point spread function of the R channel, as the integral of the point spread function of a spectroscopy wavelength, a change in point spread function due to the infrared cut filter is considered in creating an image recovery filter.

Although the optical imaging system 101 is shown as part of the image capture apparatus in FIG. 1, it may have an interchangeable arrangement like a lens-interchangeable camera.

FIG. 7 is a flowchart for explaining the image recovery processing in the image recovery processing unit 111.

In step S301, the image recovery processing unit 111 obtains actual captured state information from the state detection unit 107. The captured state indicates image capturing conditions such as a zoom position, the diameter of an aperture stop, and an object distance. Note that the captured state information is often written in the header portion of an image file. When the image recovery processing is executed for a captured image, captured state information may be obtained from an image file.

In step S302, the image recovery processing unit 111 corrects a chromatic difference of magnification. The correction processing of the chromatic difference of magnification is executed by shifting a pixel position as described above, and an image recovery filter for correcting various aberrations of an optical system is not applied. A value calculated based on the design values of the optical imaging system may be used as a correction amount for the chromatic difference of magnification, or a correction amount may be determined by detecting the chromatic difference of magnification from the image as described above.

In step S303, the image recovery processing unit 111 selects an image recovery filter appropriate for the image capturing conditions. At this time, the selected image recovery filter may be corrected as needed. That is, discrete captured state data are prepared to decrease the number of data of image recovery filters prepared in advance in the storage unit 108, and an image recovery filter is corrected according to the actual captured state when executing the image recovery processing. Instead of selecting an image recovery filter, it may be generated according to the captured state based on information about an optical transfer function necessary for generating an image recovery filter.

For the image recovery filter used in this embodiment, a translation component for chromatic difference of magnification correction has been removed. That is, the image recovery filter includes at least one of a spherical aberration correction component, a coma aberration correction component, a curvature of field correction component, and an astigmatism correction component, and does not include a chromatic difference of magnification correction component. The image recovery filter sharpens the image by correcting the asymmetry and spread of aberrations but does not correct the translation component of the chromatic difference of magnification. As described above, using such an image recovery filter enables to process the chromatic difference of magnification independently of the image recovery processing. That is, it is possible to separately process correction for asymmetrical aberrations and sharpening for each color component, and correction for a color deviation as the translation component of the chromatic difference of magnification.

In step S304, the image recovery processing unit 111 obtains color difference information for each pixel as an example of a feature amount associated with color of the image for which the chromatic difference of magnification has been corrected in step S302. In this case, the input image is formed by R, G, and B components, and a color difference is defined as a signal value difference with respect to a reference color G. The color difference is thus calculated by:

$$C1r(x,y) = R1(x,y) - G1(x,y) \quad (14)$$

$$C1b(x,y) = B1(x,y) - G1(x,y) \quad (15)$$

where R1, G1, and B1 respectively represent the R, G, and B signal values before the image recovery processing, (x, y) represents a coordinate value on the image, and C1$r$ and C1$b$ respectively represent the color differences of the R and B components with respect to the G component.

Note that if the input image is, for example, a so-called RAW image captured by an image sensor having a Bayer array primary color filter, each pixel has only one of the values of the R, G, and B components. The value of the G component in an R or B pixel is generated by adaptively interpolating the value of a G pixel, thereby obtaining C1$r$ and C1$b$.

On the other hand, if color interpolation processing has already been executed, and each pixel has the values of the R, G, and B components, C1$r$ and C1$b$ are obtained in each pixel. If each pixel has the values of the R, G, and B components, the value of a Y (luminance) component may be obtained based on the values of the R, G, and B components in each pixel, thereby obtaining, as C1$r$ and C1$b$, the color differences of the R and B components with respect to the luminance component, respectively.

In step S305, the image recovery processing unit 111 uses the image recovery filter selected or generated in step S303 to execute the above-described convolution processing for each pixel of the input image. This enables to correct the asymmetry of the point spread function due to the aberrations of the optical imaging system 101, thereby removing or reducing the blur components of the image.

In step S306, the image recovery processing unit 111 obtains color difference information for each pixel as an example of a feature amount associated with the color of the image after the image recovery processing in step S305, similarly to step S304. Note that R2, G2, and B2 respectively represent the R, G, and B signal values after the image recovery processing, (x, y) represents a coordinate value on the image, and C2$r$ and C2$b$ respectively represent the color differences of the R and B components with respect to the G component, which are defined by:

$$C2r(x,y)=R2(x,y)-G2(x,y) \quad (16)$$

$$C2b(x,y)=B2(x,y)-G2(x,y) \quad (17)$$

Note that similarly to a case in which C1$r$ and C1$b$ are obtained, if the input image is a RAW image before color interpolation, the value of a G component in an R or B pixel is generated by adaptively interpolating the value of a G pixel, thereby obtaining C2$r$ and C2$b$.

On the other hand, if color interpolation processing has already been executed, and each pixel has the values of the R, G, and B components, C2$r$ and C2$b$ are obtained in each pixel.

In step S307, based on the pieces C1$r$, C1$b$, C2$r$, and C2$b$ of color difference information of each pixel before and after the image recovery processing, which have been obtained in steps S304 and S306, the image recovery processing unit 111 determines whether pixel value adjustment for suppressing coloring is necessary. This determination can be made based on whether the color difference has increased or whether the sign of the color difference has been inverted, as will be described below.

The image recovery processing unit 111 makes a determination for R and B pixels of R, G, B pixels (or R and B components in each pixel). If any one of the following conditions is satisfied, it is determined that pixel value adjustment for suppressing coloring is necessary for the pixel of a corresponding color component.

Determination for R
Determination Condition 1:
  C1$r$(x, y) and C2$r$(x, y) have the same sign and |C1$r$(x, y)|<|C2$r$(x, y)|.
Determination Condition 2:
  C1$r$(x, y) and C2$r$(x, y) have different signs.
Determination for B
Determination Condition 1:
  C1$b$(x, y) and C2$b$(x, y) have the same sign and |C1$b$(x, y)|<|C2$b$(x, y)|.
Determination Condition 2:
  C1$b$(x, y) and C2$b$(x, y) have different signs.

For a pixel for which it has been determined as the determination result that pixel value adjustment is necessary, the image recovery processing unit 111 applies pixel value adjustment for suppressing coloring in step S308. The pixel value adjustment processing uses the color difference before the image recovery processing when the color difference has increased, and sets the color difference to zero when the sign of the color difference has been inverted, as will be described below.

Pixel Value Adjustment for R
if determination condition 1 is satisfied (the color difference has increased):

$$R2(x,y)=G2(x,y)+k \times C1r(x,y)(0<k \leq 1) \quad (18)$$

if determination condition 2 is satisfied (the sign of the color difference has been inverted):

$$R2(x,y)=G2(x,y) \quad (19)$$

Pixel Value Adjustment for B
if determination condition 1 is satisfied (the color difference has increased):

$$B2(x,y)=G2(x,y)+k \times C1b(x,y)(0<k \leq 1) \quad (20)$$

if determination condition 2 is satisfied (the sign of the color difference has been inverted):

$$B2(x,y)=G2(x,y) \quad (21)$$

As described above, the processing according to the flowchart of FIG. 7 executes the image recovery processing in the image processing unit 104 (image recovery processing unit 111). Note that since the optical transfer function of the optical imaging system 101 changes depending on the image height of the optical imaging system even in one captured state, it is desirable to change and execute the above-described image recovery processing for each region (each of the regions h1 to h8 in FIG. 6) divided according to the image height. More specifically, it is only necessary to cause the image recovery filter to scan the image while executing convolution processing, thereby sequentially changing the filter for each region. That is, the processing in step S303 is executed for each target pixel.

Note that application of an image recovery filter=image recovery processing is assumed for the sake of simplicity and for easy understanding of the embodiment. The image recovery processing may include, as its part, another correction processing such as distortion correction processing, ambient light amount correction processing, and noise reduction processing.

An example of the operation and effect of chromatic difference of magnification correction, obtaining of pieces of color difference information before and after the image recovery processing, and application of an image recovery filter, which are performed in steps S302, S304, S305, S306, and S308 will be described with reference to FIGS. 9A to 9C and 10A to 10C.

Figure 8:
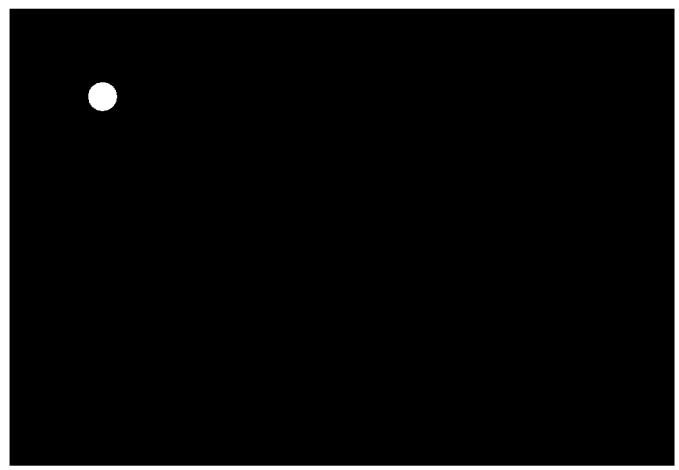
FIG. 8 is a view showing a point light source according to an embodiment of the present invention.
Figure 9A:
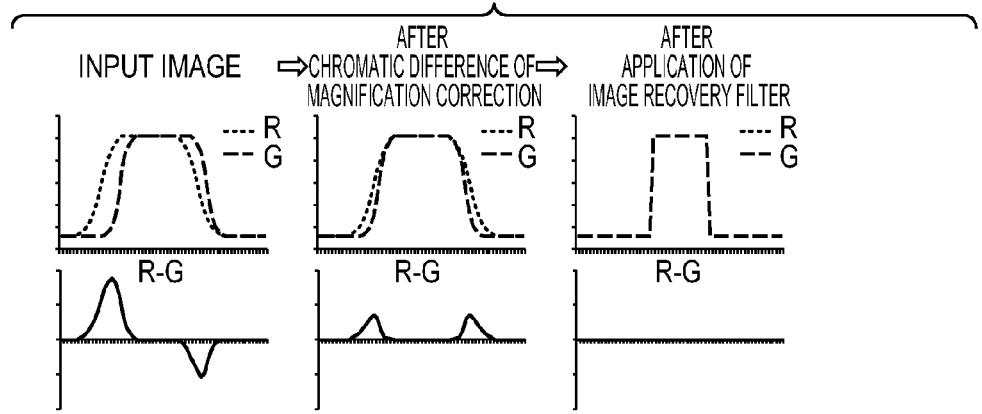
FIGS. 9A to 9C are views for explaining the operation and effect of the image recovery processing according to the first embodiment of the present invention.
Figure 9B:
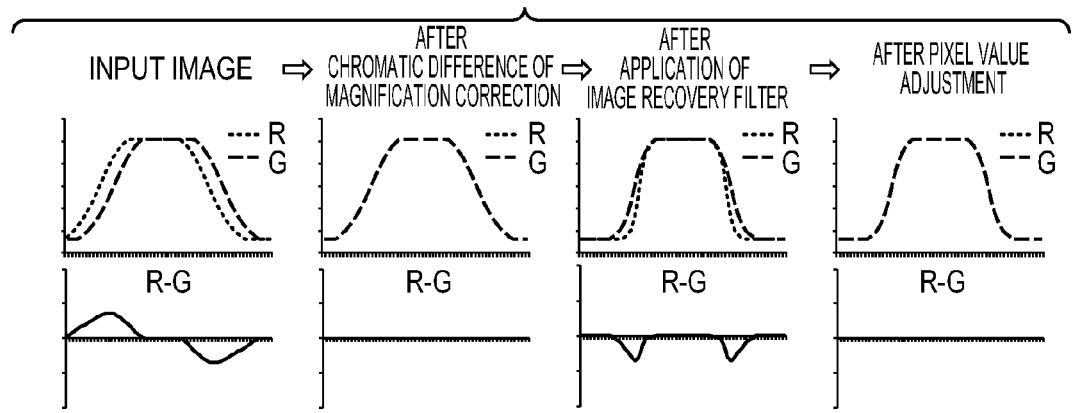
Figure 9C:
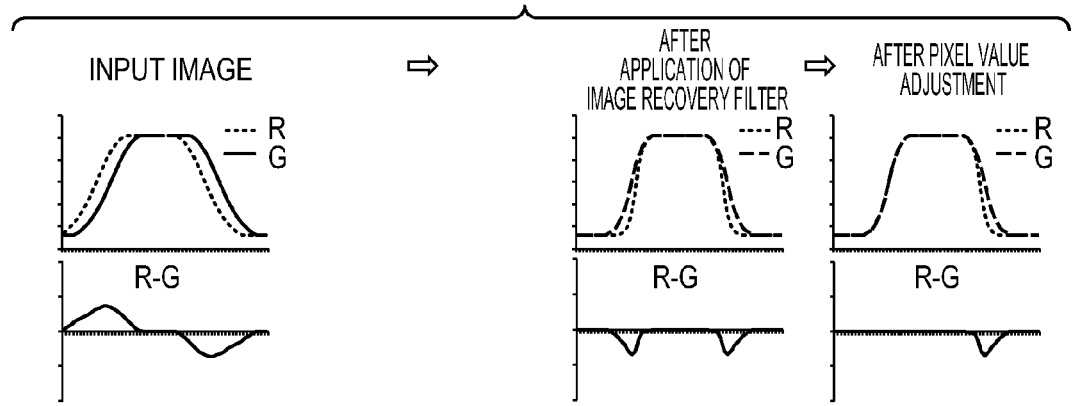

FIGS. 9A to 9C are schematic views each showing an example of pixel values, at and around a point light source in the horizontal direction, in an input shown in FIG. 8 that has been obtained by capturing a field of view, around the perimeter of which the point light source exists. In each of FIGS. 9A to 9C, an upper portion shows the pixel values of the R and G components, and a lower portion shows a difference between the values of the R and G components shown in the upper portion, that is, a color difference.

FIG. 9B shows an out-of-focus state. As compared with FIG. 9A which shows an in-focus state, in FIG. 9B, a color deviation due to a chromatic difference of magnification occurs similarly to FIG. 9A but the amounts of blur of the G and R components are large and the degrees of blur of the G and R components are equal to each other. After chromatic difference of magnification correction, the positions of the R and G components coincide with each other, the degrees of blur of the G and R components are equal to each other, and thus no color fringing occurs at this stage. After applying an image recovery filter, the amounts of blur of the G and R components decrease but the remaining amounts of blur of the G and R components are different from each other, thereby causing color fringing. The color fringing is coloring to be suppressed in this embodiment.

Figure 10A:
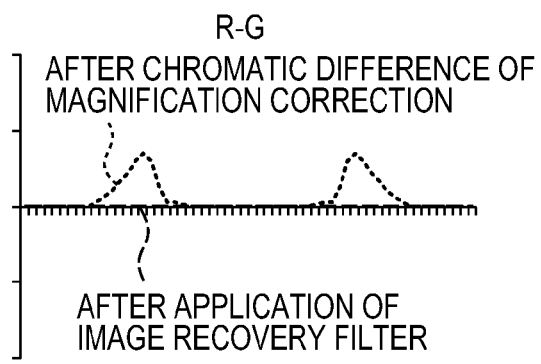
FIGS. 10A to 10C are views for explaining the operation and effect of the image recovery processing according to the first embodiment of the present invention.
Figure 10B:
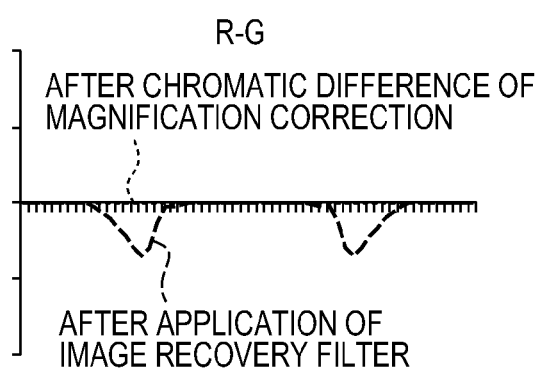

FIG. 10B shows the relationship between pieces of color difference information before and after application of the image recovery filter, which corresponds to FIG. 9B. Although a color difference before application of an image recovery filter and after chromatic difference of magnification correction is 0 for the whole region, a color difference occurs in an edge portion after application of the image recovery filter. The determination processing in step S307, therefore, determines that pixel value adjustment is necessary because the color difference increases, and the image recovery processing unit 111 applies pixel value adjustment for suppressing coloring in step S308. Since in the pixel value adjustment processing in step S308, the color difference before application of the image recovery filter and after chromatic difference of magnification is used, the color difference after the pixel value adjustment processing is 0 for the whole region, thereby obtaining an image in which the coloring has been appropriately suppressed.

As described above, in this embodiment, it is possible to efficiently suppress coloring that occurs in application of the image recovery filter to an out-of-focus portion. The difference between the degrees of blur of each of the G and R components before and after application of the image recovery filter in each of the in-focus state shown in FIG. 9A and the out-of-focus state shown in FIG. 9B will be described with reference to FIGS. 11A to 11E. FIGS. 11A to 11D are graphs each schematically showing the MTFs of the optical imaging system 101 and the spatial frequency characteristics of the MTFs after application of the image recovery filter. FIG. 11E is a graph schematically showing the rate of increase/decrease (recovery gain) of the MTF obtained by applying the image recovery filter.

FIG. 11A shows the MTFs of the optical imaging system 101 in an in-focus state, in which the R component degrades, as compared with the G component. In the input image of FIG. 9A, the degrees of blur of the G and R components are different, and a change in pixel value of the R component spreads as compared with the G component in a point light source portion.

FIG. 11B shows the MTFs after application of the image recovery filter in an in-focus state, in which the MTFs of the G and R components have been appropriately corrected and the G and R components coincide with each other. This is obtained by multiplying the MTFs shown in FIG. 11A by the recovery gains shown in FIG. 11E, respectively. Since the image recovery filter has been designed to execute optimum image recovery processing for an in-focus object, appropriate image recovery processing is executed in an in-focus state. Referring to FIG. 9A, therefore, after application of the image recovery filter, blur of the G and R components has been appropriately removed and color fringing has also been removed.

On the other hand, FIG. 11C shows the MTFs of the optical imaging system 101 in an out-of-focus state, in which the G and R components degrade and coincide with each other, as compared with the in-focus state shown in FIG. 11A. In the input image of FIG. 9B, the degrees of blur of the G and R components are equal to each other, and are larger than those in the in-focus state shown in FIG. 9A.

FIG. 11D shows the MTFs after application of the image recovery filter in an out-of-focus state, in which the MTFs of the G and R components have been corrected but the G component degrades as compared with the R component. This is obtained by multiplying the MTFs shown in FIG. 11C by the recovery gains shown in FIG. 11E, respectively. Since the image recovery filter has been designed to execute optimum image recovery processing for an in-focus object, an expected image recovery result may not be obtained in the out-of-focus state. Referring to FIG. 9B, therefore, after application of the image recovery filter, the amounts of blur of the G and R components have decreased but the G component has spread as compared with the R component.

FIG. 9C shows a case in which an image recovery filter includes a chromatic difference of magnification correction component unlike the embodiment.

FIG. 9C shows a case in which an image recovery filter including a chromatic difference of magnification correction component is applied in an out-of-focus state similar to that in FIG. 9B. An input image is the same as that in FIG. 9B. Although chromatic difference of magnification correction is not performed, it is performed by applying the image recovery filter, and thus an image after application of the image recovery filter is also the same as that in FIG. 9B.

Figure 10C:
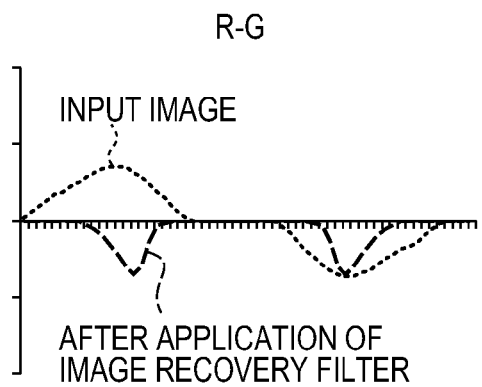

FIG. 10C shows the relationship between pieces of color difference information before and after application of the image recovery filter. A color difference of the input image before application of the image recovery filter has a positive value in a left edge portion and has a negative value in a right edge portion due to a color deviation. After application of the image recovery filter, a color difference having a negative value occurs in both the edge portions. The determination processing in step S307, therefore, determines that pixel value adjustment is necessary, by determining that the sign of the color difference has been inverted in the left edge portion. Pixel value adjustment for suppressing coloring is performed in step S308, thereby suppressing coloring. Since, however, the color difference has not increased or the sign of the color difference has not been inverted in the right edge portion, it is determined that pixel value adjustment is not necessary, and thus pixel value adjustment is not performed in step S308. An image recovery processing result is output without suppressing coloring in the right edge portion.

As described above, if an image recovery filter includes a chromatic difference of magnification correction component, coloring that occurs in application of the image recovery filter is not sufficiently suppressed, thereby degrading the image quality.

As described above, according to the embodiment, an image recovery filter which does not correct a chromatic difference of magnification is used as an image recovery filter for correcting the aberrations of the optical imaging system, and a chromatic difference of magnification is corrected by another method different from the image recovery filter before application of the image recovery filter. This makes it possible to correct coloring which is caused by the image recovery filter and occurs when the state of aberrations in an actual captured state is different from that of aberrations assumed by the image recovery filter, separately from coloring caused by a chromatic difference of magnification, thereby efficiently suppressing the coloring.

That is, it is possible to separate coloring due to a color deviation of a chromatic difference of magnification from coloring which occurs when blur is removed, thereby suppressing only the coloring which occurs when blur is removed. As described above, according to the embodiment, image recovery processing which suppresses coloring as a whole is possible.

(Second Embodiment)

The second embodiment of the present invention will be described. A case in which this embodiment is applied to an image capture apparatus shown in FIG. 1 similar to the first embodiment will now be explained. In this embodiment, the image recovery processing in an image processing unit 104 (image recovery processing unit 111) is different from that in the first embodiment. The image recovery processing in this embodiment, therefore, will be described with reference to FIG. 12.

Figure 12:
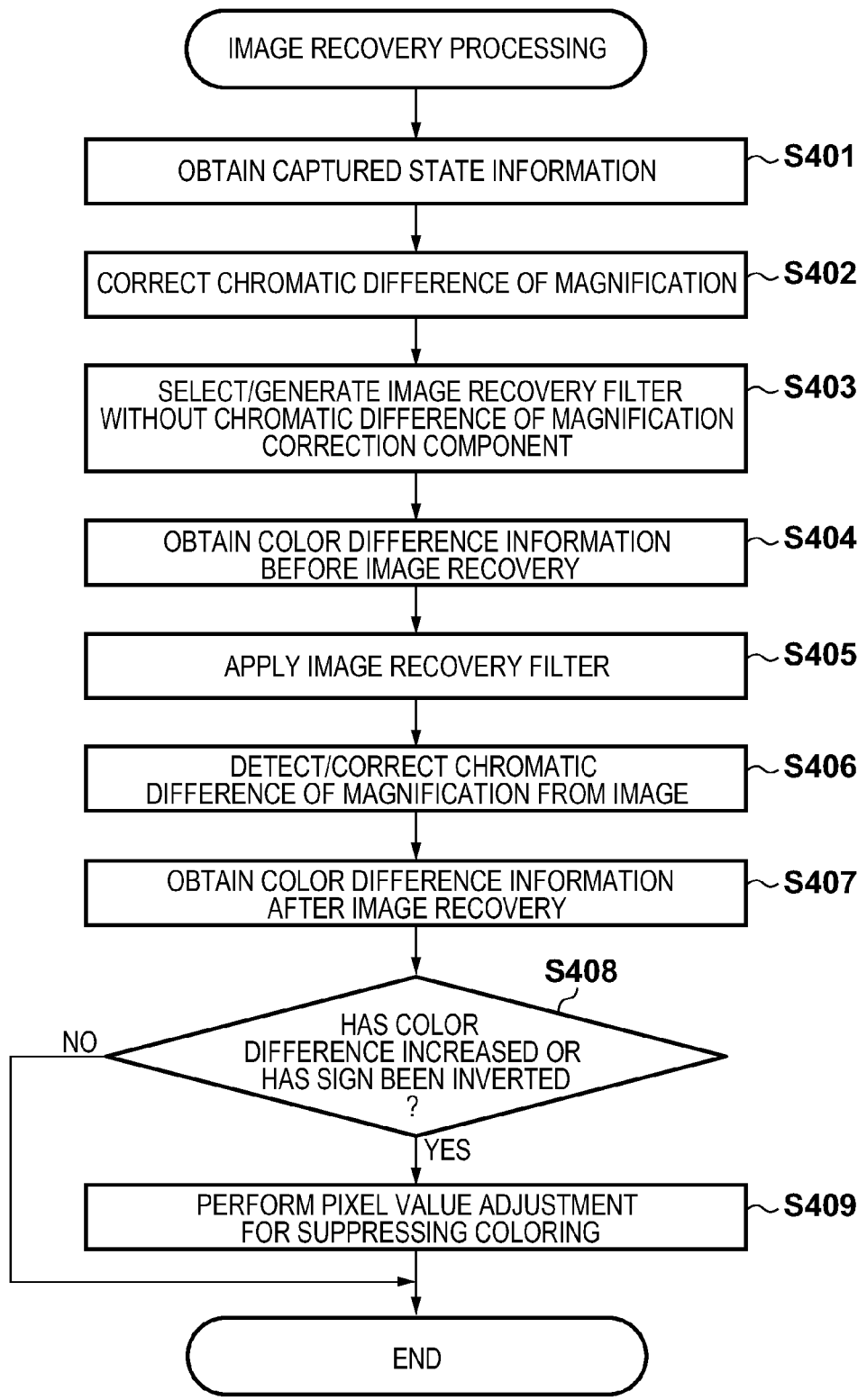
FIG. 12 is a flowchart illustrating image recovery processing according to a second embodiment of the present invention.

Note that processing in steps S401 to S405 of FIG. 12 is the same as that in steps S301 to S305 of FIG. 7, and a description thereof will be omitted. This embodiment is characterized in that after applying an image recovery filter in step S405, a chromatic difference of magnification is corrected using a correction amount generated by detecting the chromatic difference of magnification from an image in step S406.

FIGS. 13A to 13D and 14A to 14D are views showing an example of the operation and effect of chromatic difference of magnification correction, obtaining of pieces of color difference information before and after the image recovery processing, and application of an image recovery filter, which are performed in steps S402, S404, S405, S406, S407, and S408 in this embodiment.

FIGS. 13A to 13D are schematic views each showing an example of pixel values, in the meridional direction (in the radial direction from the center of the image) at and around a point light source, in an input shown in FIG. 8 that has been obtained by capturing a field of view, around the perimeter of which the point light source exists. In each of FIGS. 13A to 13D, an upper portion shows the pixel values of R and G components, and a lower portion shows a difference between the values of the R and G components shown in the upper portion, that is, a color difference. Since the pixel direction of interest is different from that in FIGS. 9A to 9C, asymmetrical aberrations occur, and the degrees of blur in left and right edge portions are different from each other.

Figure 13A:
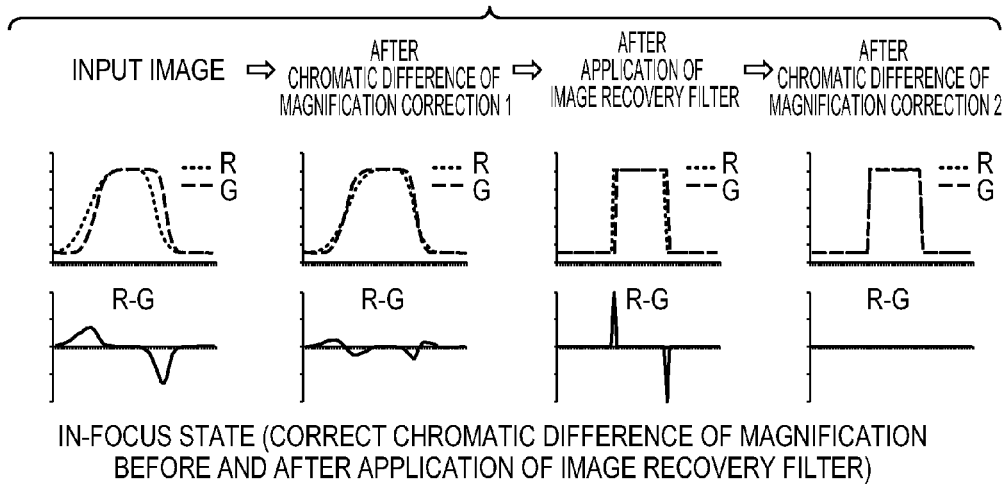

An effect obtained by detecting a chromatic difference of magnification from the image and correcting it in step S406 after applying an image recovery filter which does not correct the chromatic difference of magnification will be described with reference to FIG. 13A. FIG. 13A shows an in-focus state. A color deviation occurs for the G and R components in the input image due to the chromatic difference of magnification, the degrees of blur of the G and R components are different from each other, and the degrees of blur in the left and right edge portions are different from each other due to different aberrations.

"After chromatic difference of magnification correction 1" in FIG. 13A shows a result of the chromatic difference of magnification correction processing performed in step S402 before application of the image recovery filter. The chromatic difference of magnification correction processing is performed in step S402 to obtain an image in which a color deviation is noticeable as little as possible while the states of aberrations in the left and right edge portions remain different from each other. A value calculated based on the design values of an optical imaging system 101 may be used as a correction amount for the chromatic difference of magnification, or a correction amount may be determined by detecting the chromatic difference of magnification from the image.

By applying the image recovery filter, the asymmetrical aberrations at the edges of the G and R components are corrected and sharpened. However, a color deviation between the G and R components remains. This remaining color deviation is caused by, for example, a fact that the state of aberrations in capturing an image is different from that of aberrations to be processed by the image recovery filter due to a manufacturing variation of the optical imaging system 101 and a variation in spectrum of the light source. Furthermore, if a correction amount is determined by detecting the chromatic difference of magnification from the image in the chromatic difference of magnification correction processing performed in step S402 before application of the image recovery filter, the amount of the chromatic difference of magnification is detected at the edge where the asymmetry remains. Therefore, a correction amount for the chromatic difference of magnification which is different from a correction amount appropriate for the state of the edge after the image recovery processing may be obtained. In this case, a color deviation remains.

This embodiment deals with a color deviation which remains after application of the image recovery filter for such reasons. In step S406, the image recovery processing unit 111 as a second chromatic difference of magnification correction means detects a chromatic difference of magnification from the image after application of the image recovery filter and corrects it. "After chromatic difference of magnification correction 2" in FIG. 13A shows a state after the chromatic difference of magnification correction processing in step S406. In "after chromatic difference of magnification correction 2", the remaining color deviation has been appropriately corrected. For the input image, the edges have undergone asymmetric aberration correction, and have been sharpened. Thus, the G and R components coincide with each other, and color fringing has been removed.

In step S407, the image recovery processing unit 111 obtains color difference information for each pixel as an example of a feature amount associated with the color of the image after the chromatic difference of magnification correction processing in step S406, similarly to step S306.

Processing to be executed in steps S408 and S409 is the same as that in steps S307 and S308 of FIG. 7 described in the first embodiment, and a description thereof will be omitted.

Figure 14A:
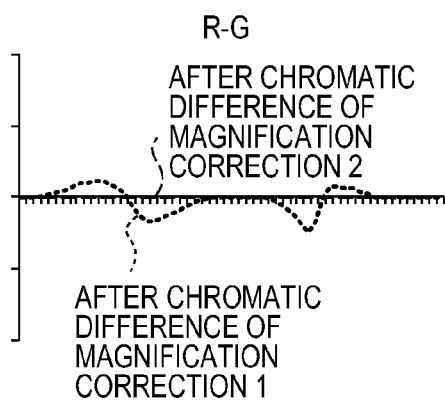
FIGS. 14A to 14D are views for explaining the operation and effect of the image recovery processing according to the second embodiment of the present invention.

FIG. 14A shows the pieces of color difference information obtained in steps S404 and S407 in the in-focus state shown in FIG. 13A. In this case, the color difference in "after chromatic difference of magnification correction 1" before application of the image recovery filter has a value at the edge portion, and the color difference in "after chromatic difference of magnification correction 2" after application of the image recovery filter is 0 for the whole region. The determination processing in step S408, therefore, determines that pixel value adjustment for suppressing coloring is not necessary, and thus the image of "after chromatic difference of magnification correction 2" is obtained as an image recovery processing result intact.

Figure 13B:
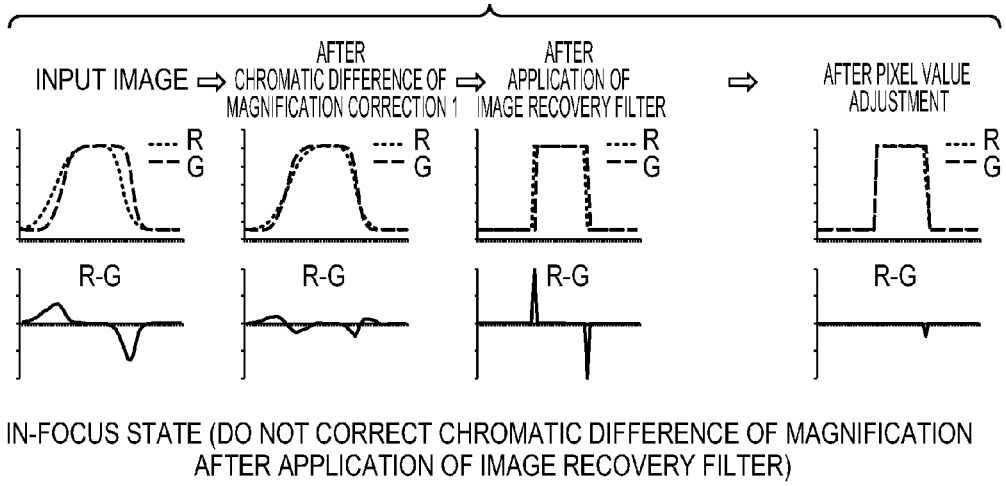
Figure 14B:
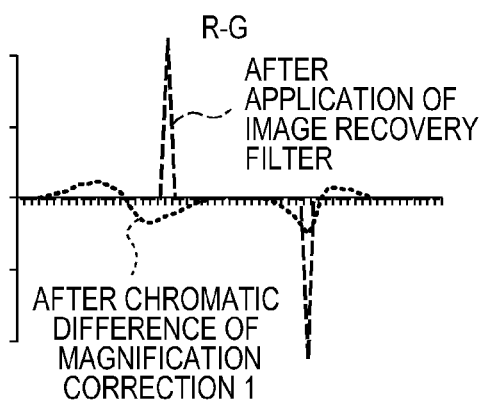

FIG. 13B shows a case in which the chromatic difference of magnification correction processing in step S406 is not performed for the same input image as that of FIG. 13A after application of the image recovery filter, unlike this embodiment. In this case, the color difference information obtaining processing in step S407 is executed while a color deviation after application of the image recovery filter remains. As shown in FIG. 14B, the sign of the color difference has been inverted at the left edge and the color difference has increased at the right edge after the image recovery processing, pixel value adjustment for suppressing coloring is performed in step S409. An output image in this case is in a state shown in "after pixel value adjustment" of FIG. 13B. Although coloring is suppressed by the coloring suppression processing in step S409, the coloring still remains as compared with FIG. 12A when the chromatic difference of magnification correction processing is performed in step S406. As described above, it is possible to appropriately suppress coloring by detecting a chromatic difference of magnification in an image before determination of whether coloring suppression processing is necessary, and correcting the detected aberration after application of the image recovery filter.

The second embodiment of the present invention has been described. As described above, the present invention is effective even if a chromatic difference of magnification is detected from an image and is then corrected after application of an image recovery filter.

FIG. 13C shows an out-of-focus state, which corresponds to FIG. 13A. Referring to FIG. 13C, a color deviation between the G and R components has occurred in the input image due to a chromatic difference of magnification, the degrees of blur of the G and R components are equal to each other, and the degrees of blur at the left and right edges are different from each other due to different aberrations at the left and right edges. In "after chromatic difference of magnification correction 1" after the chromatic difference of magnification correction processing is performed in step S402, the positions of the R and G components coincide with each other, the degrees of blur of the G and R components are equal to each other, and thus no color fringing occurs at this stage.

Figure 14C:
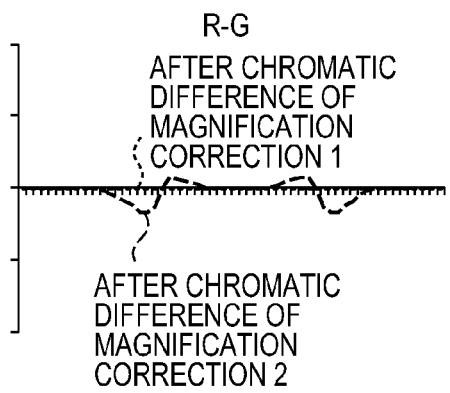

After application of the image recovery filter, the amounts of blur of the G and R components decrease bit the remaining amounts of blur of the G and R components are different from each other, thereby causing color fringing. The states of the color fringing at the left and right edges are different from each other, and can be processed as a color deviation. In "after chromatic difference of magnification correction 2" showing a result obtained by detecting a chromatic difference of magnification from the image after application of the image recovery filter and correcting it in step S406, the degrees of the color fringing at the left and right edges are equal to each other. FIG. 14C shows the relationship between the pieces of color difference information before and after the image recovery processing in this case. The color difference in "after chromatic difference of magnification correction 1" before application of the image recovery filter is 0 for the whole region, and the color difference occurs in the edge portions in "after chromatic difference of magnification correction 2" after application of the image recovery filter. The determination processing in step S408, therefore, determines that pixel value adjustment for suppressing coloring is necessary, and pixel value adjustment for suppressing coloring is performed in step S409. In step S409, the color difference in "after chromatic difference of magnification correction 1" before application of the image recovery filter is used. The color difference after the pixel value adjustment processing is 0 for the whole region, and an image in which the color difference has been appropriately suppressed is obtained as an image recovery processing result.

FIG. 13D shows a case in which an image recovery filter includes a chromatic difference of a magnification correction component, unlike this embodiment.

Figure 14D:
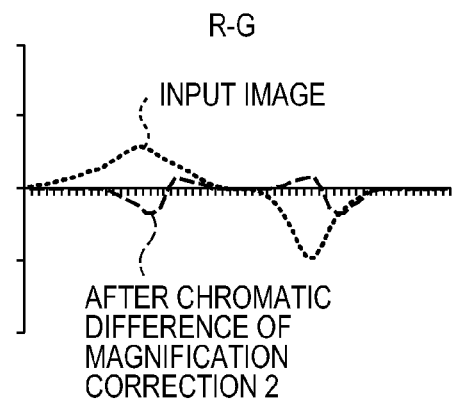

In FIG. 13D, an input image is the same as that in FIG. 13C. Since chromatic difference of magnification correction is performed by applying the image recovery filter without performing chromatic difference of magnification correction in step S402, an image after application of the image recovery filter and an image in "after chromatic difference of magnification correction 2" in which a chromatic difference of magnification has been detected from the image after application of the image recovery filter, and then corrected are the same as those in FIG. 13C. FIG. 14D shows the relationship between pieces of color difference information before and after the image recovery processing in this case. Since the sign of the color difference in part of the left and right edges has been inverted, the determination processing in step S408 determines that pixel value adjustment for suppressing coloring is necessary, and pixel value adjustment for suppressing coloring is performed in step S409. An output image in this case is in a state shown in "after pixel value adjustment" of FIG. 13D. Although coloring has been suppressed by the coloring suppression processing, the coloring still remains as compared with FIG. 13C according to this embodiment.

As described above, according to this embodiment, after application of an image recovery filter which does not correct a chromatic difference of magnification and before determination of whether pixel value adjustment for suppressing coloring is performed, a chromatic difference of magnification is detected from an image after application of the image recovery filter, and is then corrected. This enables to obtain a more preferable coloring suppression effect.

(Other Embodiments)

A case in which color differences are used as values, related to the coloring of images before and after image recovery processing, has been described in the above embodiments. The present invention, however, is not limited to using color differences, and it is also possible to use other values related to coloring which can be used to correct coloring which has occurred due to application of an image recovery filter. In the images before and after the image recovery processing, for example, a location where the sum of absolute difference values between color components is smallest may be searched for in pixels around an edge detected in a Y plane while moving an R plane (or B plane) in the meridional direction with respect to a G plane. Based on a position before movement and the detected location where the sum of the absolute difference values is smallest, it is possible to obtain a color deviation direction and amount in the R plane (or B plane) with respect to the G plane, thereby using the obtained color deviation direction and amount as feature amounts. If the color deviation direction of the image after the image recovery processing has been inverted with respect to that of the image before the image recovery processing, pixel value adjustment for suppressing coloring is performed. If the color deviation amount after the image recovery processing is larger than that before the image recovery processing even though the color deviation direction has not been inverted, pixel value adjustment for suppressing coloring is performed.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

Note that each of functional blocks such as a "unit" and a "section" in the drawings can be realized by hardware (i.e., discrete circuits, an ASIC, programmable logic devices, etc.), software (i.e., a combination of software and a processor such as a CPU and a MPU that executes the software), or a combination thereof. Also note that a plurality of the functional blocks can be realized by a single hardware entity. Also note that at least one of a plurality of processes that are described as being performed by a CPU can be performed by another proprietary or nonproprietary hardware.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-189325, filed on Aug. 31, 2011, which is hereby incorporated by reference herein its entirety.

What is claimed is:

1. An image processing apparatus for correcting for degradation in image quality due to aberrations of an optical imaging system of an image capture apparatus in an image captured by the image capture apparatus, comprising:
a first chromatic difference of magnification correction unit configured to perform correction of a chromatic difference of magnification of the optical imaging system for the image;
a first obtaining unit configured to obtain a first value related to coloring of the image in which the chromatic difference of magnification has been corrected;
an image recovery processing unit for applying, to the image in which the chromatic difference of magnification has been corrected, an image recovery filter based on a point spread function of the optical imaging system;
a second obtaining unit configured to obtain a second value related to coloring of the image to which the image recovery filter has been applied; and
a pixel value correction unit configured to correct a pixel value of the image which has been applied with the image recovery filter according to a difference between the first and second values obtained by said first obtaining unit and said second obtaining unit; and
wherein the first chromatic difference of magnification correction unit, the first obtaining unit, the image recovery processing unit, the second obtaining unit and the pixel value correction unit are implemented by one of hardware and a processor that executes software or a combination of hardware and a processor that executes software.

2. The image processing apparatus according to claim 1, wherein the image recovery filter is a filter which does not correct a chromatic difference of magnification.

3. The image processing apparatus according to claim 1, wherein the image is formed by R, G, and B components, the first and second values related to the coloring comprise a difference between a value of the R or B component and a value of the G component, and said pixel value correction unit corrects the value of the R or B component of a pixel.

4. The image processing apparatus according to claim 1, wherein the image is formed by R, G, and B components, the first and second values related to the coloring comprise a difference between a value of the R or B component and a value of a luminance component generated based on the R, G, and B components, and said pixel value correction unit corrects the value of the R or B component of a pixel.

5. The image processing apparatus according to claim 1, wherein the image is formed by R, G, and B components, and the first and second values related to the coloring comprise a color deviation direction and magnitude relating to a movement of the R or B plane with respect to the G plane made in finding an edge in the Y plane, and said pixel value correction unit corrects the value of the R or B component of a pixel.

6. The image processing apparatus according to claim 1, further comprising a second chromatic difference of magnification correction unit configured to detect a chromatic difference of magnification from the image which has been applied with the image recovery filter, and correct the detected chromatic difference of magnification,
wherein said second obtaining unit obtains the value related to the coloring of the image in which said second chromatic difference of magnification correction unit has corrected the chromatic difference of magnification.

7. The image processing apparatus according to claim 1, wherein the image recovery filter is generated based on a point spread function of the optical imaging system, for which a difference between color components of the point spread function is decreased by translating a point spread function of a given color component to a position of a point spread function of another color component.

8. The image processing apparatus according to claim 1, wherein the image recovery filter is based on an optical transfer function of the optical imaging system, for which a linear component has been removed from a frequency characteristic of a phase of the optical transfer function.

9. An image capture apparatus comprising:
an optical imaging system for imaging an optical image of an object;
an image sensor for capturing the optical image; and
an image processing apparatus according to claim 1.

10. The image processing apparatus according to claim 1, wherein the image is formed by a plurality of color components.

11. The image processing apparatus according to claim 10, wherein the image recovery processing unit applies the image recovery filter to the image, in which the chromatic difference of magnification has been corrected and is formed by the plurality of color components.

12. The image processing apparatus according to claim 10, wherein the plurality of color components are R, G, and B components.

13. The image processing apparatus according to claim 1, wherein the pixel value correction unit corrects the pixel value of the image which has been applied with the image recovery filter, when the second value is larger than the first value.

14. The image processing apparatus according to claim 1, wherein the pixel value correction unit corrects a pixel value so that a color difference is decreased, for a pixel of which the second value is larger than the first value.

15. The image processing apparatus according to claim 1, wherein the pixel value correction unit corrects the pixel value of the image which has been applied with the image recovery filter, when the sign of the second value differs from the sign of the first value.

16. The image processing apparatus according to claim 1, wherein the pixel value correction unit corrects a pixel value so that a color difference is decreased, for a pixel of which the second value and the first value have different signs.

17. An image processing method of correcting for degradation in image quality due to aberrations of an optical imaging system of an image capture apparatus in an image captured by the image capture apparatus, comprising:
a step of performing correction of a chromatic difference of magnification of the optical imaging system for the image;
a first obtaining step of obtaining a first value related to coloring of the image in which the chromatic difference of magnification has been corrected;

a step of applying, to the image in which the chromatic difference of magnification has been corrected, an image recovery filter based on a point spread function of the optical imaging system;

a second obtaining step of obtaining a second value related to coloring of the image to which the image recovery filter has been applied; and a step of correcting a pixel value of the image which has been applied with the image recovery filter according to a difference between the first and second values obtained in the first obtaining step and the second obtaining step.

18. A non-transitory computer-readable recording medium recording a program for causing a computer to perform the method of claim 17.

19. An image processing apparatus for correcting an image captured by an image capture apparatus, comprising:
   a chromatic difference of magnification correction unit configured to perform a correction of an effect of a chromatic difference of magnification in the image;
   an image recovery processing unit for applying, to the image in which the effect has been corrected, an image recovery filter to correct for degradation in image quality due to aberrations of an optical imaging system of the image capture apparatus; and
   a pixel value correction unit configured to correct a pixel value of the image to which the image recovery filter has been applied, based on the image in which the effect has been corrected and the image recovery filter has not been applied,
   wherein the chromatic difference of magnification correction unit, the image recovery processing unit, and the pixel value correction unit are implemented by one of hardware and a processor that executes software or a combination of hardware and a processor that executes software.

20. The image processing apparatus according to claim 19, wherein the image recovery filter is generated based on a point spread function or an optical transfer function of the optical image system.

21. An image processing apparatus for correcting an image captured by an image capture apparatus, comprising:
   a chromatic difference of magnification correction unit configured to perform a correction of an effect of a chromatic difference of magnification in the image; and
   an image recovery processing unit for applying, to the image in which the effect has been corrected, an image recovery filter to correct for degradation in image quality due to aberrations of an optical imaging system of the image capture apparatus;
   wherein the image recovery filter is generated based on a point spread function of the optical imaging system, for which a difference between color components of the point spread function is decreased by translating a point spread function of a given color component to a position of a point spread function of another color component, and
   wherein the chromatic difference of magnification correction unit and the image recovery processing unit are implemented by one of hardware and a processor that executes software or a combination of hardware and a processor that executes software.

22. An image processing method of correcting an image captured by an image capture apparatus, comprising:
   a step of performing a correction of an effect of a chromatic difference of magnification in the image;
   a step of applying, to the image in which the effect has been corrected, an image recovery filter to correct for degradation in image quality due to aberrations of an optical imaging system of the image capture apparatus; and
   a step of correcting a pixel value of the image to which the image recovery filter has been applied, based on the image in which the effect has been corrected and the image recovery filter has not been applied.

23. An image processing method of correcting an image captured by an image capture apparatus, comprising:
   a step of performing a correction of an effect of a chromatic difference of magnification in the image; and
   a step of applying, to the image in which the effect has been corrected, an image recovery filter to correct for degradation in image quality due to aberrations of an optical imaging system of the image capture apparatus;
   wherein the image recovery filter is generated based on a point spread function of the optical imaging system, for which a difference between color components of the point spread function is decreased by translating a point spread function of a given color component to a position of a point spread function of another color component.

* * * * *